(12) United States Patent
Wang et al.

(10) Patent No.: US 12,004,174 B2
(45) Date of Patent: Jun. 4, 2024

(54) SUPPORT FOR AN INCREASED QUANTITY OF SIDELINK CONFIGURED GRANTS

(71) Applicant: QUALCOMM Incorporated, San Diego, CA (US)

(72) Inventors: Xiaojie Wang, Hillsborough, NJ (US); Piyush Gupta, Bridgewater, NJ (US); Lik Hang Silas Fong, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 17/334,325

(22) Filed: May 28, 2021

(65) Prior Publication Data
US 2022/0394750 A1  Dec. 8, 2022

(51) Int. Cl.
*H04W 72/23* (2023.01)
*H04L 1/00* (2006.01)

(52) U.S. Cl.
CPC .......... *H04W 72/23* (2023.01); *H04L 1/0061* (2013.01)

(58) Field of Classification Search
CPC .. H04W 72/14; H04W 72/1289; H04L 1/0061
USPC ........................................................ 370/329
See application file for complete search history.

(56) References Cited

U.S. PATENT DOCUMENTS

| | | | | |
|---|---|---|---|---|
| 2016/0036618 A1* | 2/2016 | Einhaus | ................. | H04L 1/0003 370/329 |
| 2018/0062724 A1* | 3/2018 | Onggosanusi | ....... | H04B 7/0413 |
| 2020/0015272 A1* | 1/2020 | Lee | ......................... | H04W 8/005 |
| 2020/0029318 A1* | 1/2020 | Guo | ..................... | H04W 72/042 |
| 2020/0084783 A1* | 3/2020 | Li | ........................... | H04L 5/0053 |
| 2020/0100088 A1* | 3/2020 | Kim | ...................... | H04W 48/16 |
| 2020/0107236 A1* | 4/2020 | Tseng | ..................... | H04W 76/27 |
| 2020/0267729 A1* | 8/2020 | Kim | ....................... | H04W 72/20 |
| 2020/0267755 A1 | 8/2020 | Ugurlu et al. | | |
| 2020/0396760 A1* | 12/2020 | Yi | .......................... | H04L 1/1864 |

(Continued)

FOREIGN PATENT DOCUMENTS

| CA | 3056318 A1 * | 11/2018 | ........... H04L 5/0053 |
|---|---|---|---|
| CA | 3095194 A1 * | 4/2021 | ........... H04L 1/1812 |

OTHER PUBLICATIONS

3GPP TSG RAN1 WG1 (Meeting #98 Prague, CZ, Aug. 26-30, 2019, R1-1908397, Agenda item: 7.2.4.2.1) (Year: 2019).*

(Continued)

*Primary Examiner* — Tejis Daya
*Assistant Examiner* — Oladiran Gideon Olaleye
(74) *Attorney, Agent, or Firm* — Procopio, Cory, Hargreaves & Savitch LLP

(57) ABSTRACT

Apparatus, methods, and computer-readable media for facilitating support for an increased quantity of sidelink configured grants are disclosed herein. An example method for wireless communication at a user equipment (UE) includes receiving scheduling information corresponding to a first quantity of sidelink configured grants, the first quantity of sidelink configured grants being greater than eight sidelink configured grants. The example method also includes receiving, from a base station, an activation of a sidelink configured grant of the first quantity of sidelink configured grants. The example method also includes transmitting sidelink traffic to a second UE based on the sidelink configured grant.

32 Claims, 18 Drawing Sheets

(56) References Cited

U.S. PATENT DOCUMENTS

| | | | |
|---|---|---|---|
| 2021/0051646 A1* | 2/2021 | Maaref | H04W 72/005 |
| 2021/0112582 A1* | 4/2021 | Lee | H04W 72/0493 |
| 2021/0136646 A1* | 5/2021 | Tseng | H04L 5/0091 |
| 2021/0144750 A1* | 5/2021 | Cao | H04W 72/0446 |
| 2021/0168762 A1* | 6/2021 | Huang | H04W 72/0446 |
| 2021/0168814 A1* | 6/2021 | Chen | H04W 72/0493 |
| 2021/0204288 A1* | 7/2021 | Ji | H04W 72/0453 |
| 2021/0250931 A1* | 8/2021 | Yang | H04L 5/0053 |
| 2021/0297959 A1* | 9/2021 | Zhou | H04B 7/0602 |
| 2021/0298058 A1* | 9/2021 | Bergman | H04W 72/1289 |
| 2021/0321396 A1* | 10/2021 | Li | H04L 1/1854 |
| 2021/0360590 A1* | 11/2021 | Lee | H04L 5/0091 |
| 2022/0007411 A1* | 1/2022 | Takeda | H04W 72/14 |
| 2022/0159583 A1* | 5/2022 | Wang | H04W 52/383 |
| 2022/0217764 A1* | 7/2022 | Yoshioka | H04W 72/14 |
| 2022/0232545 A1* | 7/2022 | Mukherjee | H04L 5/0094 |
| 2022/0239417 A1* | 7/2022 | Cheng | H04L 1/1896 |
| 2022/0255680 A1* | 8/2022 | Moon | H04W 72/1284 |
| 2022/0338235 A1* | 10/2022 | Bagheri | H04W 72/1289 |

OTHER PUBLICATIONS

Apple: "Remaining Issues of Model Resource Allocation", 3GPP Draft, 3GPP TSG RAN WG1 #101, R1-2004216, 3rd Generation Partnership Project (3GPP), Mobile Competence Centre, 650, Route Des Lucioles, F-06921 Sophia-Antipolis Cedex, France, vol. RAN WG1, No. e-Meeting, May 25, 2020-Jun. 5, 2020, May 16, 2020 (May 16, 2020), XP051885974, 7 Pages, Section 2.3.2, Paragraph [2.1.1], Paragraph [02.2], Paragraph [2.3.2].

International Search Report and Written Opinion—PCT/US2022/022883—ISA/EPO—dated Jun. 28, 2022.

Mediatek Inc: "Discussion on Mode-1 Resource Allocation for NR SL", 3GPP TSG RAN1 WG1 Meeting #98, R1-1908397, 3GPP, Mobile Competence Centre, 650, Route Des Lucioles, F-06921 Sophia-Antipolis Cedex, vol. RAN WG1, No. Prague, CZ, Aug. 26, 2019-Aug. 30, 2019, 9 Pages, Aug. 17, 2019, XP051765006, Retrieved from the Internet: URL: http://www.3gpp.org/ftp/tsg_ran/WG1_RL1/TSGR1_98/Docs/R1-1908397.zip.

Mediatek Inc: "On SL Configured Grant", 3GPP TG-RAN WG2 Meeting #108, R2-1914655 (Resubmission of R2-1913237), 3GPP, Mobile Competence Centre, 650, Route Des Lucioles, F-06921 Sophia-Antipolis Cedex, France, vol. RAN WG2, No. Reno, USA, Nov. 18, 2019-Nov. 22, 2019, Nov. 8, 2019, 5 Pages, XP051816677, URL: https://ftp.3gpp.org/tsg_ran/WG2_RL2/TSGR2_108/Docs/R2-1914655.zip R2-1914655 On SL configured grant.docx.

* cited by examiner

| 602 | | 604 |
|---|---|---|
| Priority | | 3 bits |
| FDRA | | bits depending on # of slot reservations and # subchannels |
| TDRA | | 5 or 9 bits for 2 or 3 reservations |
| Resource reservation period | | bits depending on # allowed periods |
| DM-RS pattern | | bits depending on # configured patterns |
| SCI 2 format | | 2bits |
| Beta offset for SCI 2 rate matching | | 2bits |
| DM-RS port | | 1 bit indicating one or two data layers |
| MCS | | 5bits |
| Additional MCS table | | 0-2bits |
| PSFCH overhead indicator | | 0 or 1 bit |
| Reserved bits | | bits up to upper layer |

FIG. 6A

| 652 | | 654 |
|---|---|---|
| | | bits depending on # HARQ process |
| HARQ ID | | 1bit |
| NDI | | 2bits |
| RV-ID | | 8bits |
| Source ID | | 16 bits |
| Dest. ID | | 1bit |
| HARQ enable/disable | | |
| SCI 2-A only fields | | 2 bits |
| Cast type (broadcast, groupcast, unicast) | | 1bit |
| CSI request | | |
| SCI 2-B only fields | | 12 bits |
| Zone ID | | 4bits |
| Communication range | | |

FIG. 6B

| 802 | 804 |
|---|---|
| Resource Pool Index | # of bits depends on the number of resources pools |
| Time gap | 3 bits |
| HARQ Process Number (HPN) | 4 bits |
| New Data Indicator (NDI) | 1 bit |
| Lowest Sub-channel Index | # of bits depends on the number of sidelink sub-channels |
| FDRA for SCI | # of bits depends on number of slot reservations and number of subchannels |
| TDRA for SCI | 5 or 9 bits for 2 or 3 reservations |
| PSFCH-to-HARQ feedback | # of bits depends on the on the number of entries in a higher layer |
| PUCCH Resource Indicator (PRI) | 3 bits |
| Configuration index | 0 or 3 bits |
| Sidelink Assignment Index (SAI) | 2 bits |

FIG. 8

SUPPORT FOR AN INCREASED QUANTITY OF SIDELINK CONFIGURED GRANTS

TECHNICAL FIELD

The present disclosure relates generally to communication systems, and more particularly, to wireless communication using sidelink.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication of a user equipment (UE). An example apparatus receives scheduling information corresponding to a first quantity of sidelink configured grants, the first quantity of sidelink configured grants being greater than eight sidelink configured grants. The example apparatus also receives, from a base station, an activation of a sidelink configured grant of the first quantity of sidelink configured grants. Additionally, the example apparatus transmits sidelink traffic to a second UE based on the sidelink configured grant.

In another aspect of the disclosure, a method, a computer-readable medium, and an apparatus are provided for wireless communication of a base station. An example apparatus transmits scheduling information corresponding to a first quantity of sidelink configured grants, the first quantity of sidelink configured grants being greater than eight sidelink configured grants. The example apparatus also transmits, to a UE, an activation of a sidelink configured grant of the first quantity of sidelink configured grants.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6A illustrates an example first stage sidelink control information (SCI), in accordance with various aspects of the present disclosure.

FIG. 6B illustrates an example second stage SCI, in accordance with various aspects of the present disclosure.

FIG. 8 illustrates an example downlink control information for allocating sidelink resources, in accordance with various aspects of the present disclosure.

DETAILED DESCRIPTION

Figure 1:
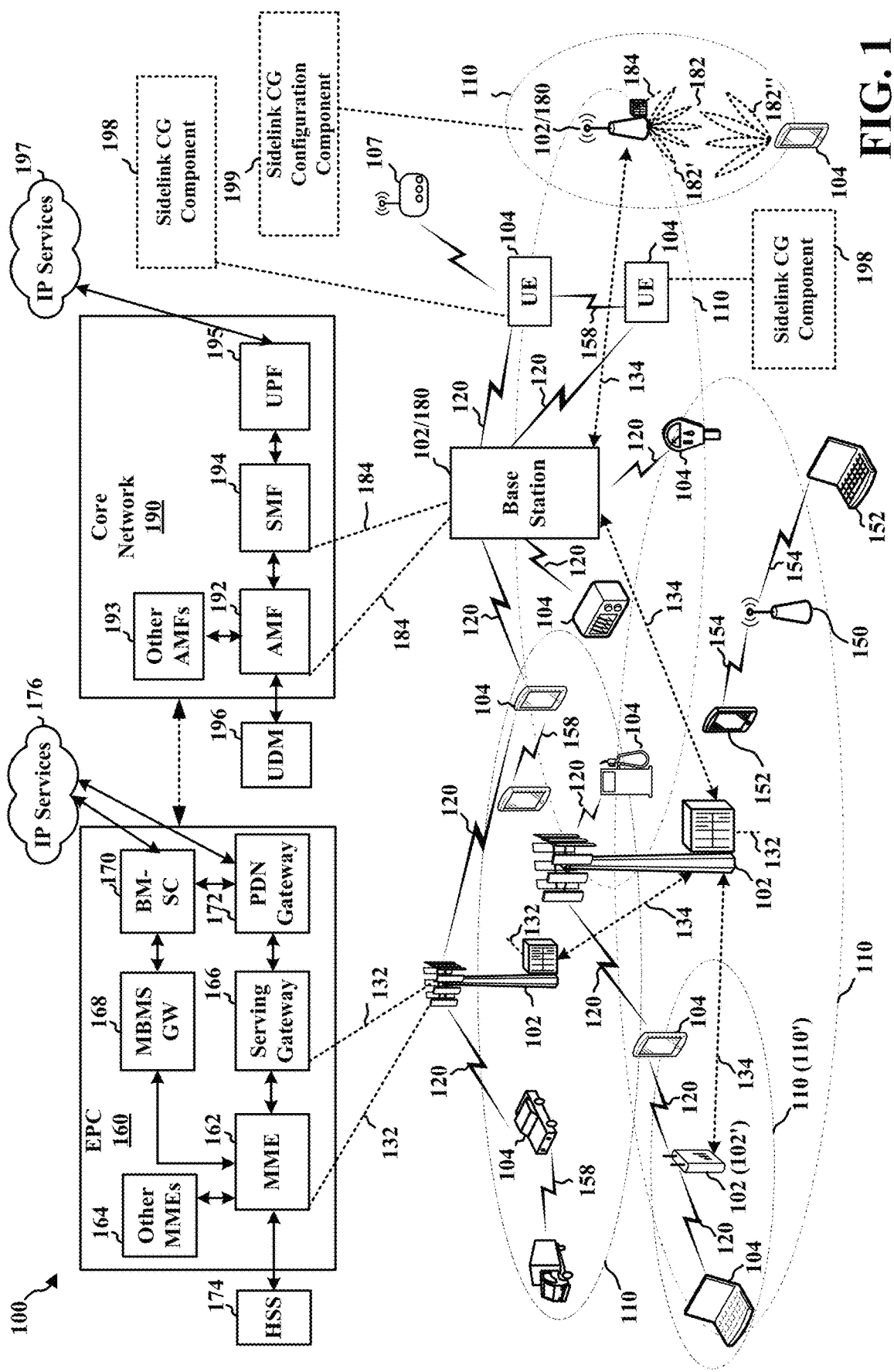
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

In some examples, sidelink may provide support for up to eight sidelink configured grants. A sidelink configured grant may include a periodic resource grant to allow a transmitting UE to use for sidelink communication. In some examples, the transmitting UE may be communication with a large number of other devices via sidelink. For example, in an IIoT deployment, the transmitting UE may control 20 to 50 SAs. In such examples, the eight sidelink configured grants may not be sufficient to satisfy communication standards associated with the IIoT deployment.

Aspects disclosed herein provide techniques for expanding (or increasing) the quantity of configured grants that may be configured for sidelink. By increasing the quantity of configured grants, the transmitting UE may communicate with more UEs and avoid resource collisions. For example, disclosed techniques enable a base station to configure the transmitting UE with an expanded set of sidelink configured grant (SLCG) configurations. The expanded set of SLCG configurations may include more than the eight SLCG configurations limited by the three bits of the configuration index field of the DCI. The configuring of the expanded set of SLCG configurations may be performed via RRC signaling between a base station and the transmitting UE.

To accommodate for the increased quantity of SLCG configurations, aspects disclosed herein provide techniques for indicating an activated or deactivated configuration that is included in the expanded set of SLCG configurations. Aspects disclosed herein further provide techniques for joint SLCG activation and release. For example, the configuration index of a DCI may activate (or deactivate) two or more SLCGs. In some examples, DCI may be used for a dynamic grant and to activate a configured grant. Thus, aspects disclosed herein provide techniques for validating the DCI to prevent the false interpretation of a dynamic grant as a configured grant, or of a configured grant as a dynamic grant. When the transmitting UE is configured to transmit feedback to the base station in associated with an SLCG (e.g., an activation or deactivation of an SLCG), aspects disclosed herein provide techniques for transmitting the feedback via uplink control information (UCI). Using UCI to transmit the feedback may provide for faster confirmation (e.g., of successfully processing the activation/deactivation of an SLCG) and may avoid delays associated with waiting for the scheduling of uplink data (e.g., PUSCH).

FIG. 1 is a diagram illustrating an example of a wireless communications system and an access network 100 including base stations 102 and 180 and UEs 104. In certain aspects, a device in communication with a base station, such as a UE 104, may be configured to manage one or more aspects of wireless communication by facilitating support for receiving a configuration of larger numbers of configured grants from which one or more of the configured grants may be activated for the UE. The added number of configured grants enables more flexibility in scheduling at the UE, while maintaining reduced scheduling overhead through use of a configured grant. For example, the UE 104 may include a sidelink configured grant (CG) component 198 configured to support receiving the configuration of larger numbers of configured grants. In certain aspects, the sidelink CG component 198 may be configured to receive scheduling information corresponding to a first quantity of sidelink configured grants, the first quantity of sidelink configured grants being greater than eight sidelink configured grants. The example sidelink CG component 198 may also be configured to receive, from a base station, an activation of a sidelink configured grant of the first quantity of sidelink configured grants. Additionally, the sidelink CG component 198 may be configured to transmit sidelink traffic to a second UE based on the sidelink configured grant.

In another configuration, a base station, such as the base stations 102 and 180, may be configured to manage or more aspects of wireless communication by facilitating configuring a UE with larger numbers of configured grants from which one or more of the configured grants may be activated for the UE. The added number of configured grants enables more flexibility in scheduling at the UE, while maintaining reduced scheduling overhead through use of a configured grant. For example, the base stations 102/180 may include a sidelink CG configuration component 199 configured to configure a UE with larger numbers of configured grants from which one or more of the configured grants may be activated for the UE. In certain aspects, the sidelink CG configuration component 199 may be configured to transmit scheduling information corresponding to a first quantity of sidelink configured grants, the first quantity of sidelink configured grants being greater than eight sidelink configured grants. The example sidelink CG configuration component 199 may also be configured to transmit, to a UE, an activation of a sidelink configured grant of the first quantity of sidelink configured grants.

The aspects presented herein may enable a UE to support receiving a configuration of larger numbers of configured grants from which one or more of the configured grants may be activated for the UE. The added number of configured grants enables more flexibility in scheduling at the UE, while maintaining reduced scheduling overhead through use of a configured grant.

Although the following description provides examples directed to 5G NR (and, in particular, to sidelink configured grants), the concepts described herein may be applicable to other similar areas, such as LTE, LTE-A, CDMA, GSM, and/or other wireless technologies, in which a UE may receive sidelink configured grants.

Additionally, while the following description provides examples directed to industrial IoT (IIoT) deployments, the concepts described herein may be applicable to other similar areas in which low latency and ultra-reliable error rates may be beneficial.

The example of the wireless communications system of FIG. 1 (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
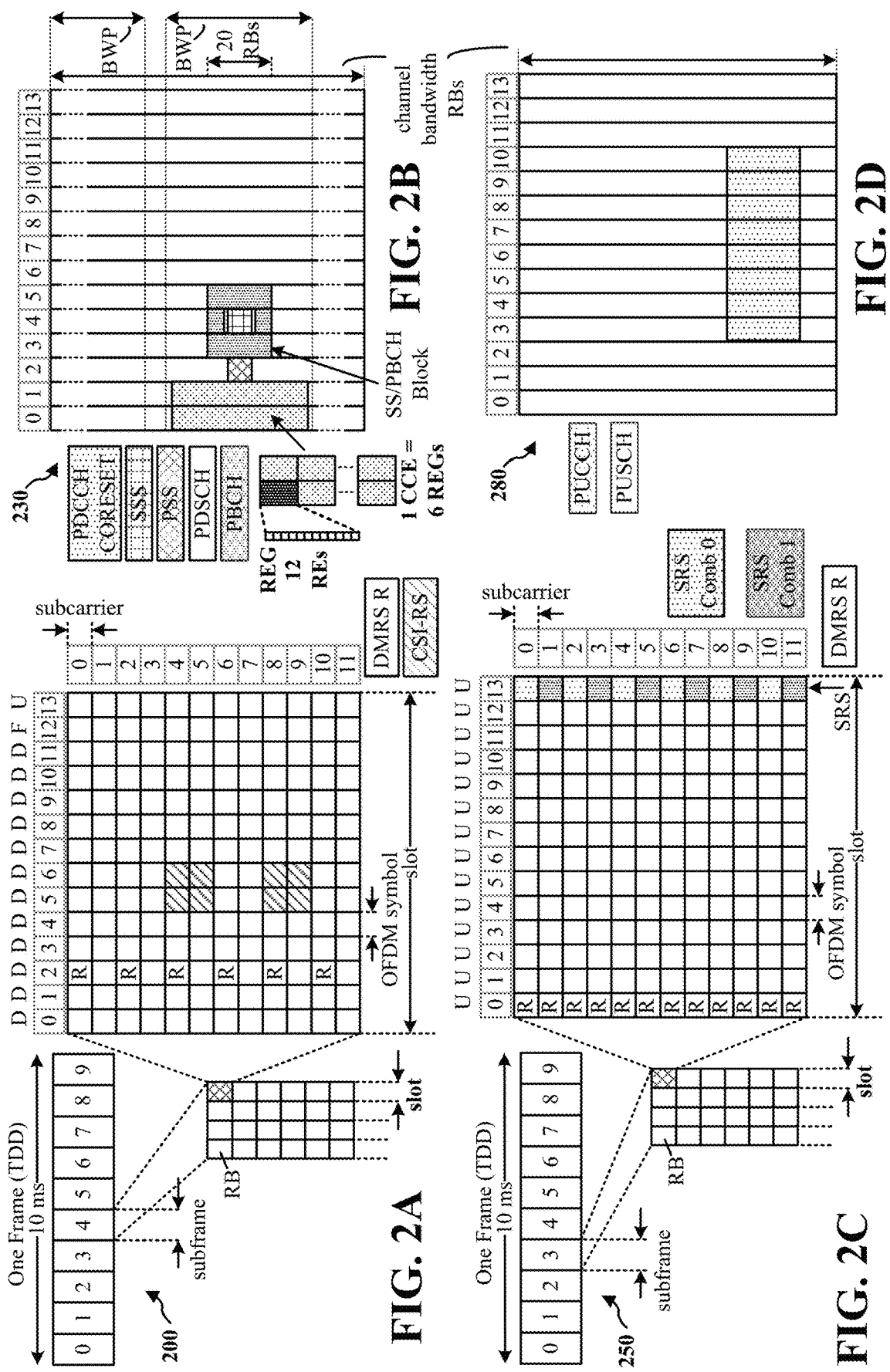
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
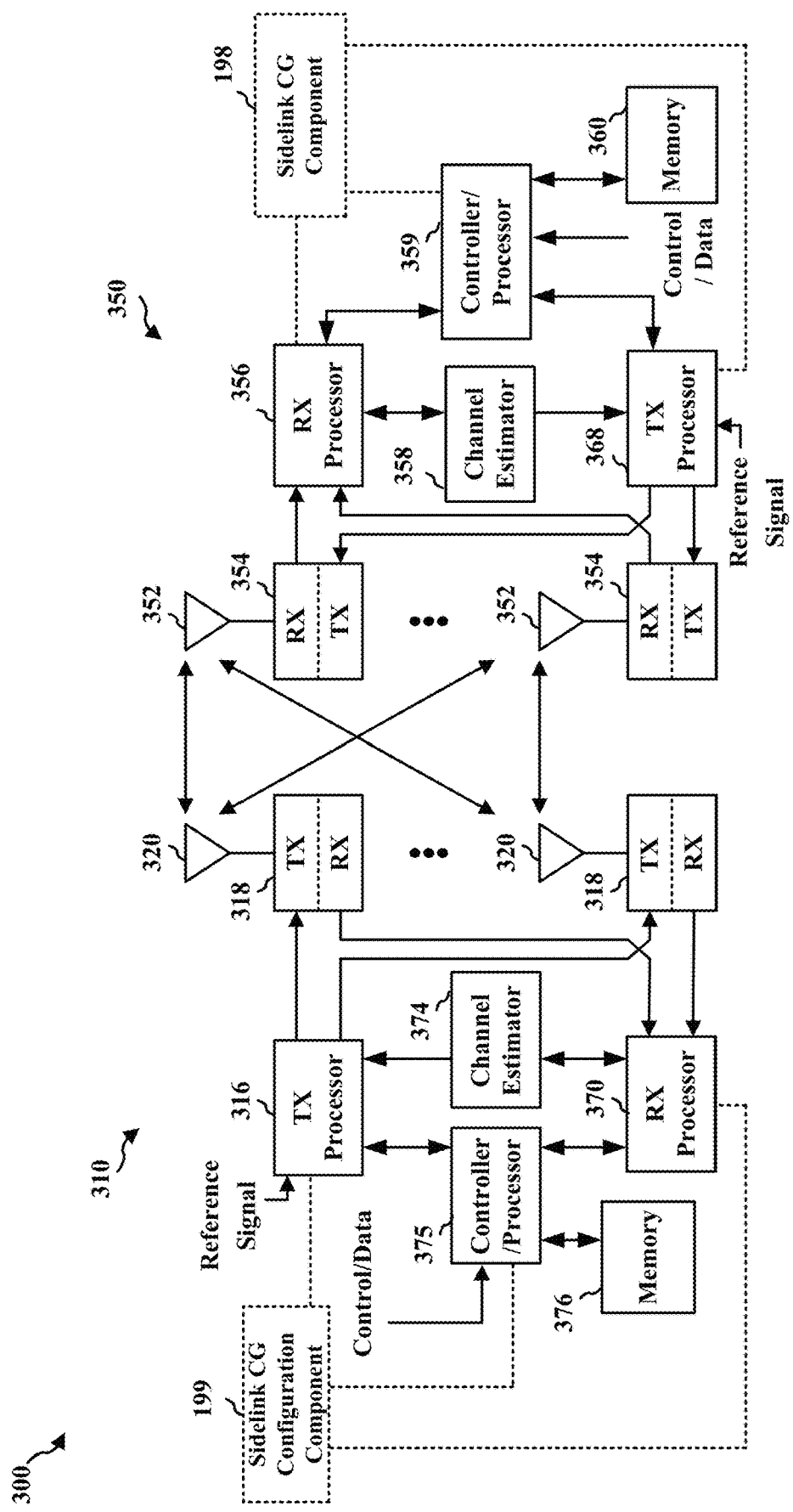
FIG. 3 is a diagram illustrating an example of a base station and a UE in an access network.

FIG. 3 is a block diagram 300 of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor (e.g., a TX processor 316) and the receive (RX) processor (e.g., an RX processor 370) implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to an RX processor 356. A TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by a channel estimator 358. The soft decisions are then decoded and deinterleaved to recover the data and control signals that were originally transmitted by the base station 310 on the physical channel. The data and control signals are then provided to a controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to the RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the sidelink CG component 198 of FIG. 1.

At least one of the TX processor 316, the RX processor 370, and the controller/processor 375 may be configured to perform aspects in connection with the sidelink CG configuration component 199 of FIG. 1.

Figure 4:
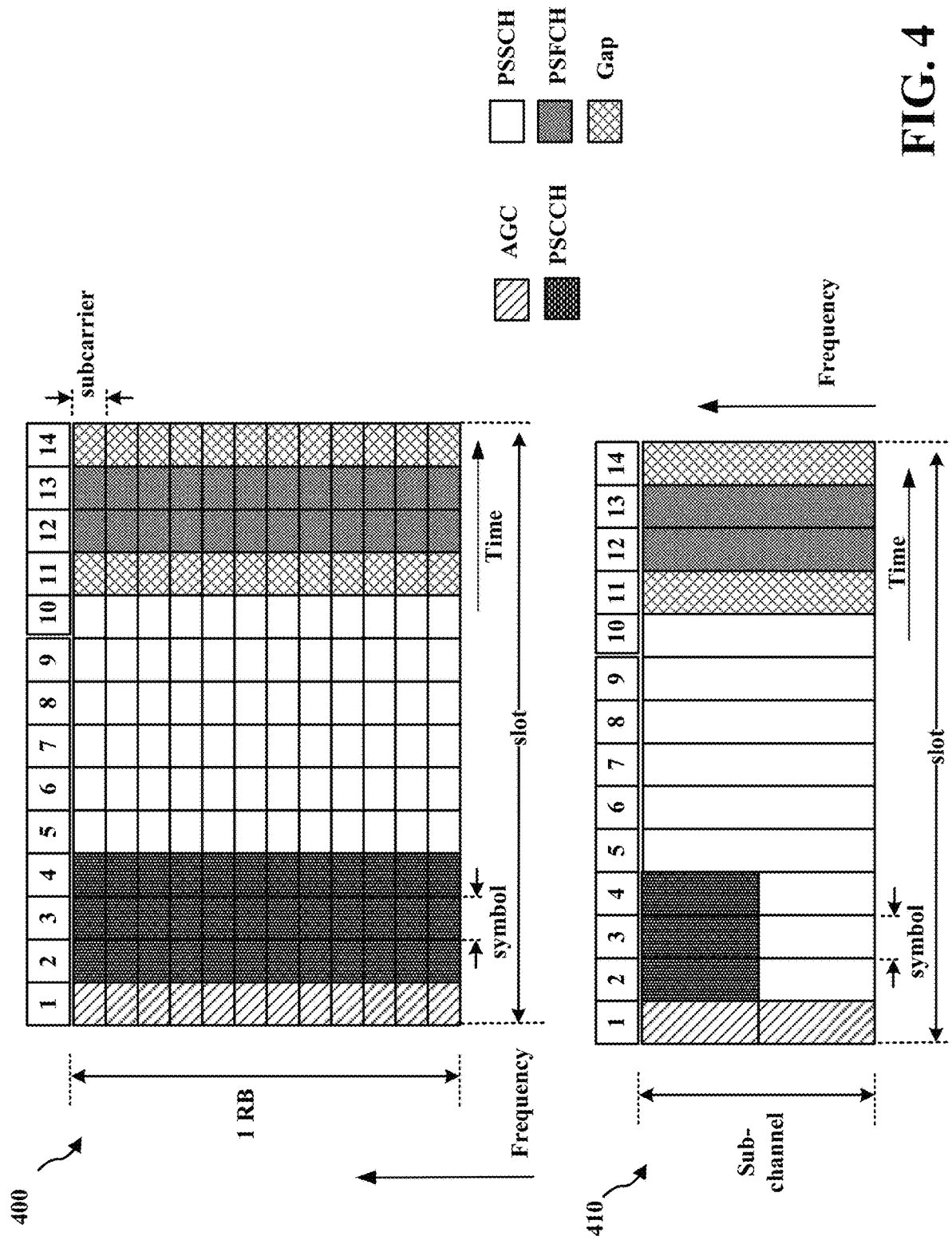
FIG. 4 includes diagrams illustrating example aspects of slot structures that may be used for sidelink communication, in accordance with various aspects of the present disclosure.

FIG. 4 includes diagrams 400 and 410 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 4 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 400 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 410 in FIG. 4 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 4, some of the REs may comprise control information in PSCCH and some REs may contain automatic gain control (AGC). Some of the REs may comprise demodulation RS (DMRS). At least one symbol may be used for feedback. FIG. 4 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, AGC, DMRS, SCI, feedback, gap symbols, and/or LBT symbols may be different than the example illustrated in FIG. 4. Multiple slots may be aggregated together in some examples.

Figure 5:
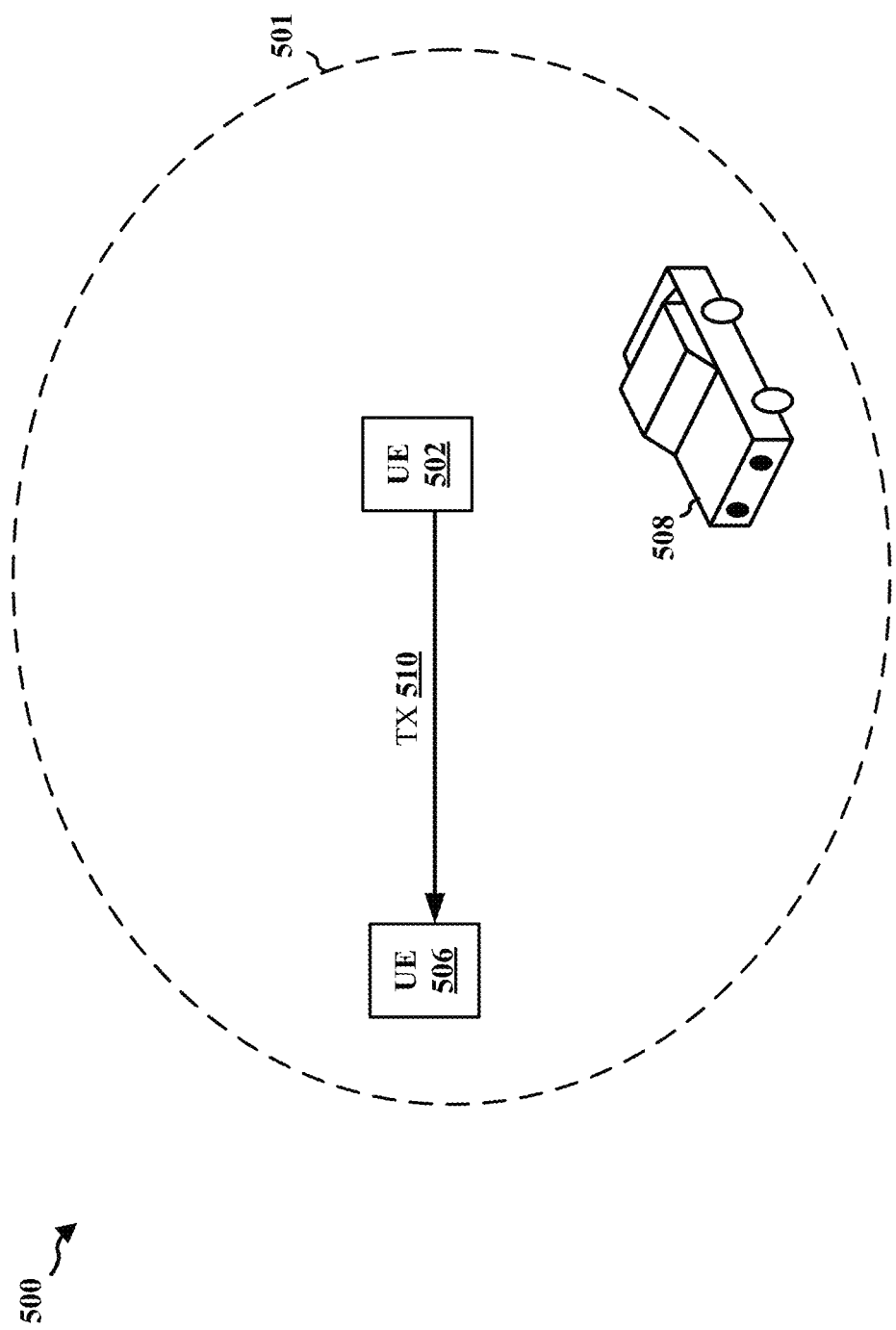
FIG. 5 illustrates an example communications environment of wireless communication between devices based on sidelink communication, in accordance with various aspects of the present disclosure.

FIG. 5 illustrates an example communications environment 500 of wireless communication between devices based on sidelink communication. The communication may be based on a slot structure comprising aspects described in connection with FIG. 4. For example, a first UE 502 may transmit a sidelink transmission 510 ("TX"), e.g., comprising a control channel (e.g., a PSCCH) and/or a corresponding data channel (e.g., a PSSCH), that may be received by a second UE 506 directly from the first UE 502 (e.g., without being transmitted through a base station).

The first UE 502 may provide SCI with information for decoding a corresponding data channel. The SCI may also include information that a receiving device may use to avoid interference. For example, the SCI may indicate time and frequency resources that will be occupied by the data transmission, and may be indicated in a control message from the transmitting device.

The UEs 502, 506, may each be capable of operating as a transmitting device in addition to operating as a receiving device. The sidelink transmission 510 may be unicast, multicast (sometimes referred to as "groupcast"), or broadcast to nearby devices. For example, the first UE 502 may transmit the sidelink transmission 510 intended for receipt by other devices within a range 501 of the first UE 502 (e.g., the second UE 506 and a vehicle UE 508).

In examples disclosed herein, when a UE transmits a transmission for sidelink communication, the transmitting UE may be referred to as a "sidelink transmitting UE" or a "sidelink transmitting device." When a UE receives a transmission via sidelink, the receiving UE may be referred to as a "sidelink receiving UE" or a "sidelink receiving device." For example, in the example of FIG. 5, the first UE 502 (e.g., a sidelink transmitting UE) may transmit the sidelink transmission 510 via sidelink. The second UE 506 (e.g., a sidelink receiving UE) may receive, via sidelink, the sidelink transmission 510.

Sidelink communication enables a UE to communicate with another UE directly. For example, the first UE 502 and the second UE 506 may communicate without routing the communication through a base station. Sidelink may be beneficial for vehicle-based communications (e.g., V2V, V2I, V2N, V2P, C-V2X, etc.) that allows a vehicle UE to communicate directly with another UE or a pedestrian UE.

Sidelink may also be beneficial in an industrial IoT (IIoT) environment in which sidelink can enable direct communication between a programmable logical controller (PLC) and one or more sensors/actuators (SAs) located within the IIoT environment. In such an environment, it may be beneficial for the PLC to be a wireless PLC to provide a flexible and simple deployment. In some such deployments, a PLC may control any suitable quantity of SAs. For example, a PLC may control 20 to 50 SAs. In some examples, communication within an IIoT deployment may be configured with requirements to provide for acceptable communication. For example, IIoT traffic may have a low latency requirement (e.g., 1-2 milliseconds (ms)) and an ultra-reliability requirement (e.g., $10^{-6}$) error rate. If the devices of the IIoT deployment were configured to communicate through a base station, it may be appreciated that such a deployment would use significant over the air (OTA) resources, which would negatively affect latency and reliability.

For example, IIoT traffic may be deterministic and with a relatively small packet size (e.g., 32 to 256 Bytes). For example, an SA may be configured to transmit an alarm event, which may use limited bandwidth resources. Thus, the bandwidth for IIoT traffic may be low. For example, two RBs may be sufficient for some use cases. SAs may have constraints on UE capability in terms of bandwidth and/or processing power. However, the overall bandwidth within the IIoT deployment may be large and include dedicated frequency bands and/or unlicensed bands. Additionally, an IIoT deployment may provide a challenging RF environment including blockage and interference.

To receive a sidelink transmission, a sidelink receiving device may perform blind decoding in all sidelink sub-channels. A sidelink sub-channel may be relatively large, such as ten or more resource blocks (RBs). The number of sidelink subchannels may be relatively small (e.g., 1 to 27 sub-channels), so the cost incurred for performing the blind decoding on all of the sidelink sub-channels may be acceptable.

As described in connection with FIG. 4, the sidelink control information (SCI) and sidelink data may be transmitted within a same slot. The sidelink data (e.g., PSSCH) may occupy up to $N_{subchannel}^{SL}$ channel contiguous sub-channels. The sidelink control information (e.g., PSCCH) may occupy up to one sub-channel with the lowest sub-channel index available. In some examples, the SCI may be transmitted in two stages. The first stage SCI may be transmitted in PSCCH and contain information about the sidelink data and/or resource reservations in future slots. The second stage SCI may be transmitted in PSSCH. A sidelink receiving device may decode the second stage SCI after decoding the PSCCH. A source identifier (ID) may indicate which UE transmitted the sidelink transmission and a destination ID may be used to distinguish whether the sidelink transmission is intended for the sidelink receiving device.

As described above, the first stage SCI may contain information about the sidelink data and/or resource reservations in future slots. For example, FIG. 6A illustrates an example first stage SCI 600. The example of FIG. 6A includes a first column 602 indicating information that may be included in the first stage SCI 600 and a second column 604 indicating a quantity of bits that may be associated with the respective information.

As shown in FIG. 6A, the first stage SCI 600 may include a frequency domain resource allocation (FDRA) and/or a time domain resource allocation (TDRA). The FDRA may comprise a first quantity of bits $$\left(\log \frac{N_{subchannel}^{SL}(N_{subchannel}^{SL}+1)}{2} \text{ bits}\right)$$

for two reservations, and may comprise a second quantity of bits $$\left(\log \frac{N_{subchannel}^{SL}(N_{subchannel}^{SL}+1)(2N_{subchannel}^{SL}+1)}{6} \text{ bits}\right)$$

for three reservations. The TDRA may comprise five bits for two reservations, and may comprise nine bits for three reservations.

FIG. 6B illustrates an example second stage SCI 650. The example of FIG. 6B includes a first column 652 indicating information that may be included in the second stage SCI 650 and a second column 654 indicating a quantity of bits that may be associated with the respective information. The second stage SCI 650 may be decoded by the target UE and any other UEs within a range of the transmitting UE. For example, and with respect to FIG. 5, the second UE 506 may be the target UE of the sidelink transmission 510, but the vehicle UE 508 may also receive the sidelink transmission 510.

The first stage SCI 600 may be decoded by the target UE and any other UEs within a range of the transmitting UE. For example, and with respect to FIG. 5, the second UE 506 may be the target UE of the sidelink transmission 510, but the vehicle UE 508 may also receive the sidelink transmission 510. The vehicle UE 508 may use information from the first stage SCI 600 for channel sensing and to avoid resource collision. The second stage SCI 650 may be used by the targeted UE (e.g., the second UE 506) to help decode the sidelink data.

In general, sidelink supports two different resource allocation modes. In a first resource allocation mode ("Mode 1"), a base station schedules sidelink resources to be used by a UE for sidelink transmissions. Such a resource allocation mode may be referred to as a "centralized resource allocation mechanism." In a second resource allocation mode ("Mode 2"), a transmitting UE autonomously decides resources to use for sidelink transmissions. Such a resource allocation mode may be referred to as a "distributed resource allocation mechanism" or a "decentralized resource allocation mechanism." The different resource allocation modes are with respect to the transmitting UE and a receiving UE operates the same regardless of whether the transmitting UE employs the first resource allocation mode or the second resource allocation mode.

The first resource allocation mode supports dynamic grants (DG) and configured grants (CG). With respect to dynamic grants, the transmitting UE requests the base station to schedule resources for a sidelink transmission. For example, after determining a transport block (TB) for sidelink transmission, the transmitting UE may transmit a scheduling request to the base station, receive downlink control information (DCI) from the base station allocating sidelink resources for the sidelink transmission, and then use the allocated resources for transmitting the TB.

In contrast, configured grants allow the transmitting UE to reduce the delay associated with transmitting the scheduling request and waiting for the DCI by pre-allocating sidelink resources. For example, with configured grants, the base station can allocate a set of sidelink resources to the transmitting UE for transmitting several TBs. The configured grant is configured using a set of parameters including a configured grant index, a time-frequency allocation, and periodicity of the allocated sidelink resources. The transmitting UE can then inform the other UEs of the resources allocated by the base station for a configured grant period using the first stage SCI. The UE can then decide how to use the sidelink resources of an assigned configured grant.

Configured grants may be CG type 1 or CG type 2. Both CG types 1 and 2 are configured using RRC signaling. With CG type 1, a transmitting UE can start using the sidelink resources once configured and until the base station releases (or deactivates) the configured grant (also using RRC signaling). With CG type 2, the transmitting UE may be configured with the configured grant, but is unable to use the configured grant until it is activated by the base station and until the base station releases the configured grant. The base station may activate and deactivate the configured grant through downlink control information (e.g., DCI format 3_0). The DCI may include the configured grant index and the time-frequency allocation of the CG type 2. The MCS may be selected by the UE within a limit set by the base station.

Thus, with CG type 1, the configuration, activation, and deactivation of a configured grant is performed via RRC signaling. In contrast, with CG type 2, the configuration of a configured grant is performed via RRC signaling, while the activation and deactivation of the configured grant are performed via DCI.

In the second resource allocation mode ("Mode 2"), the UE determines (e.g., without base station scheduling) the sidelink transmission resource(s) within a sidelink resource pool configured by the network (e.g., a base station) or determines the sidelink transmission resource(s) within a preconfigured sidelink resource pool. The transmitting UE may perform channel sensing by blindly decoding all PSCCH channels and finds which resources are reserved for other sidelink transmissions. The transmitting UE may report the available resources to an upper layer and the upper layer may decide the resource usage.

When a UE employs the second resource allocation mode, the UE may select the sidelink transmission resource(s) using sensing and resource reservation. Resource reservation may be carried in sidelink control information (SCI) (e.g., the first stage SCI). A sidelink transmission may reserve resources in a current slot and future slots.

Figure 7:
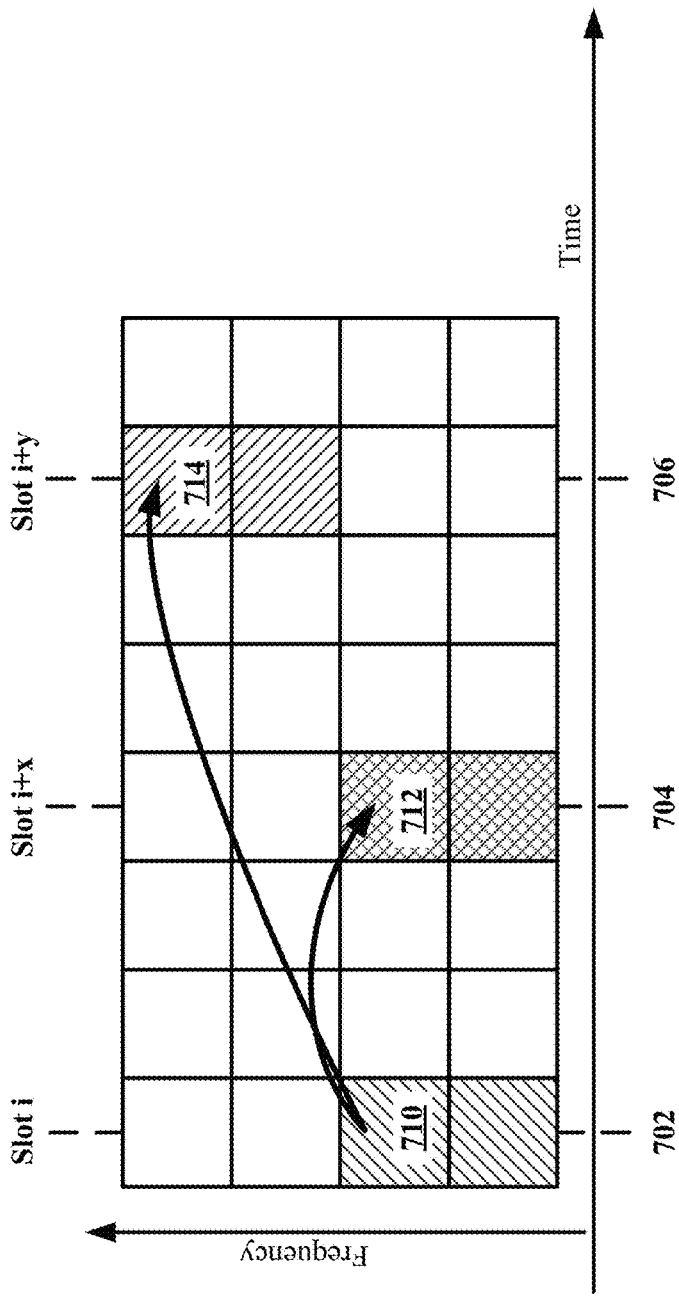
FIG. 7 illustrates a reservation window comprising slots, in accordance with various aspects of the present disclosure.

Resource allocation may be in units of sub-channels in the frequency domain and may be limited to one slot in the time domain. Reservation information may be carried in the SCI (e.g., the first stage SCI). Additionally, reservations may be reserved within a window of 32 slots. FIG. 7 illustrates a reservation window 700 comprising 32 slots, as presented herein. In the illustrated example of FIG. 7, the reservation window 700 comprises frequency domain resources along the vertical axis and time domain resources along the horizontal axis. However, it may be appreciated that other examples may employ additional or alternative techniques for implementing the reservation window.

In the illustrated example of FIG. 7, a UE may transmit a first transmission using a first resource 710 (e.g., a first slot i) at a first time 702. The UE may also transmit SCI (e.g., via the first transmission) reserving future resources, for example, to transmit a retransmission of the first transmission. For example, the SCI may include frequency domain resource allocations (FDRA) that point to frequency domain resources (e.g., sub-channels) corresponding to one or more future resources. The SCI may also include time domain resource allocations (TDRA) that point to time resources (e.g., slots) corresponding to the one or more future resources.

As shown in FIG. 7, the UE reserves a first future resource 712 (e.g., at slot i+x) at a second time 704 and reserves a second future resource 714 (e.g., at slot i+y) at a third time 706. In the illustrated example, the resources 712, 714 are associated with future resources, and the values of x and y are greater than 0. Additionally, since the reservation window 700 includes 32 slots, the values of x and y are also less than or equal to 31 (e.g., assuming that the first slot is slot 0). In the illustrated example, the value of x may be greater than 0 and less than or equal to 31. The value of y may be greater than x and less than or equal to 31 since the second future resource 714 occurs after the first future resource 712 in the time domain.

FIG. 8 illustrates an example downlink control information (DCI) 800 for allocating sidelink resources. In the illustrated example, the DCI 800 is a DCI format 3_0. However, other examples may use additional or alternative formats. The example of FIG. 8 includes a first column 802 indicating information that may be included in the DCI 800 and a second column 804 indicating a quantity of bits that may be associated with the respective information. The DCI 800 may be used by a base station for a dynamic grant (DG) or a CG type 2.

As shown in FIG. 8, the DCI 800 may include a configuration index 810. The transmitting UE may use the configuration index 810 to determine the parameters of the configured grant. For example, based on the configuration index 810, the transmitting UE may determine the time-frequency allocation and the periodicity of the allocated sidelink resources configured via RRC signaling. The configuration index 810 may be zero bits when the UE is not configured to receive a configured grant and may be three bits when the UE is configured to receive a configured grant. When the UE is configured to receive a configured grant, the configuration index 810 may be three bits when the DCI 800 is associated with a CG type 2. However, when the UE is configured to receive a dynamic grant and not configured to receive a configured grant, the configuration index 810 may be zero bits.

As used herein, the term "configured grant" and its variants refer to CG type 1 and CG type 2. However, it may be appreciated that in some examples, the term "configured grant" may refer to CG type 1 or to CG type 2. For example, when describing the activation/deactivation of a configured grant using RRC signaling, it may be appreciated that the "configured grant" refers to CG type 1. In a similar manner, when describing the activation/deactivation of a configured grant using DCI, it may be appreciated that the "configured grant" refers to CG type 2.

Figure 9:
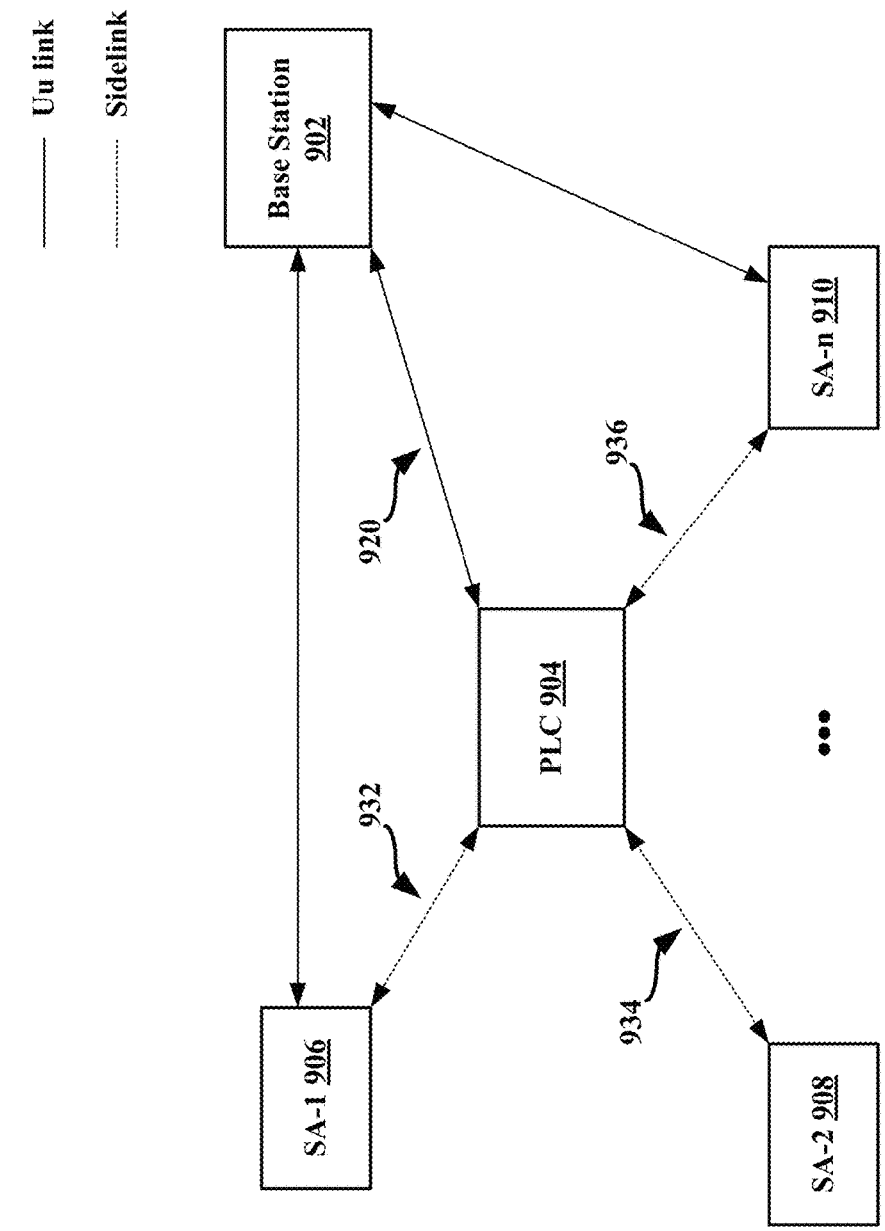
FIG. 9 illustrates an example communications environment of wireless communication between devices in an IIoT deployment, in accordance with various aspects of the present disclosure.

FIG. 9 illustrates an example communications environment 900 of wireless communication between devices in an IIoT deployment. The communication may be based on Uu link (e.g., cellular access) and sidelink. For example, a base station 902 may establish a Uu link connection 920 with a PLC 904. The PLC 904 may control a suitable quantity of SAs within the IIoT deployment, such as 20 to 50 SAs. In the illustrated example, the PLC 904 communicates with n SAs based on sidelink. For example, the PLC 904 may communicate with a first SA 906 using a first sidelink connection 932, may communicate with a second SA 908 using a second sidelink connection 934, . . . , and may communicate with an nth SA 910 using a third sidelink connection 936.

As described above, the configuration index of the DCI may be set to three when the DCI is associated with a configured grant. For example, based on the three bits allocated to the configuration index 810 of the DCI 800 of FIG. 8, it may be appreciated that the quantity of supported sidelink configured grants may be limited to eight sidelink configured grants. However, as described above, in an IIoT deployment, a PLC may control more SAs than the available configured grants. For example, the PLC 904 of FIG. 9 may control 20 to 50 SAs. Additionally, the sidelink traffic between the PLC and the SAs may be periodic. For example, the second SA 908 may periodically transmit a heartbeat via the second sidelink connection 934 to indicate that the second SA 908 is operating correctly (or incorrectly), may periodically transmit a status update, such as a pressure value or a temperature value, etc. In such examples, the eight sidelink configured grants may be insufficient for satisfying the needs of an IIoT deployment.

Although the above example of FIG. 9 refers to a PLC and SAs, it may be appreciated that aspects of the PLC 904 may be implemented by a UE and aspects of the SAs 906, 908, 910 may also be implemented by a UE.

Aspects disclosed herein provide techniques for expanding (or increasing) the quantity of configured grants that may be configured for sidelink. By increasing the quantity of configured grants, the transmitting UE may communicate with more UEs and avoid resource collisions. For example, disclosed techniques enable a base station to configure the transmitting UE with an expanded set of sidelink configured grant (SLCG) configurations. The expanded set of SLCG configurations may include more than the eight SLCG configurations limited by the three bits of the configuration index field of the DCI (e.g., the configuration index 810 of the DCI 800). The configuring of the expanded set of SLCG configurations may be performed via RRC signaling between a base station and the transmitting UE.

To accommodate for the increased quantity of SLCG configurations, aspects disclosed herein provide techniques for indicating an activated or deactivated configuration that is included in the expanded set of SLCG configurations. Aspects disclosed herein further provide techniques for joint SLCG activation and release. For example, the configuration index of a DCI may activate (or deactivate) two or more SLCGs. As described above, the dynamic grant and the CG type 2 may both be indicated via DCI. Thus, aspects disclosed herein provide techniques for validating the DCI to prevent the false interpretation of a dynamic grant as a configured grant, or of a configured grant as a dynamic grant. When the transmitting UE is configured to transmit feedback to the base station in associated with an SLCG (e.g., an activation or deactivation of an SLCG), aspects disclosed herein provide techniques for transmitting the feedback via uplink control information (UCI). Using UCI to transmit the feedback may provide for faster confirmation (e.g., of successfully processing the activation/deactivation of an SLCG) and may avoid delays associated with waiting for the scheduling of uplink data (e.g., PUSCH).

Figure 10:
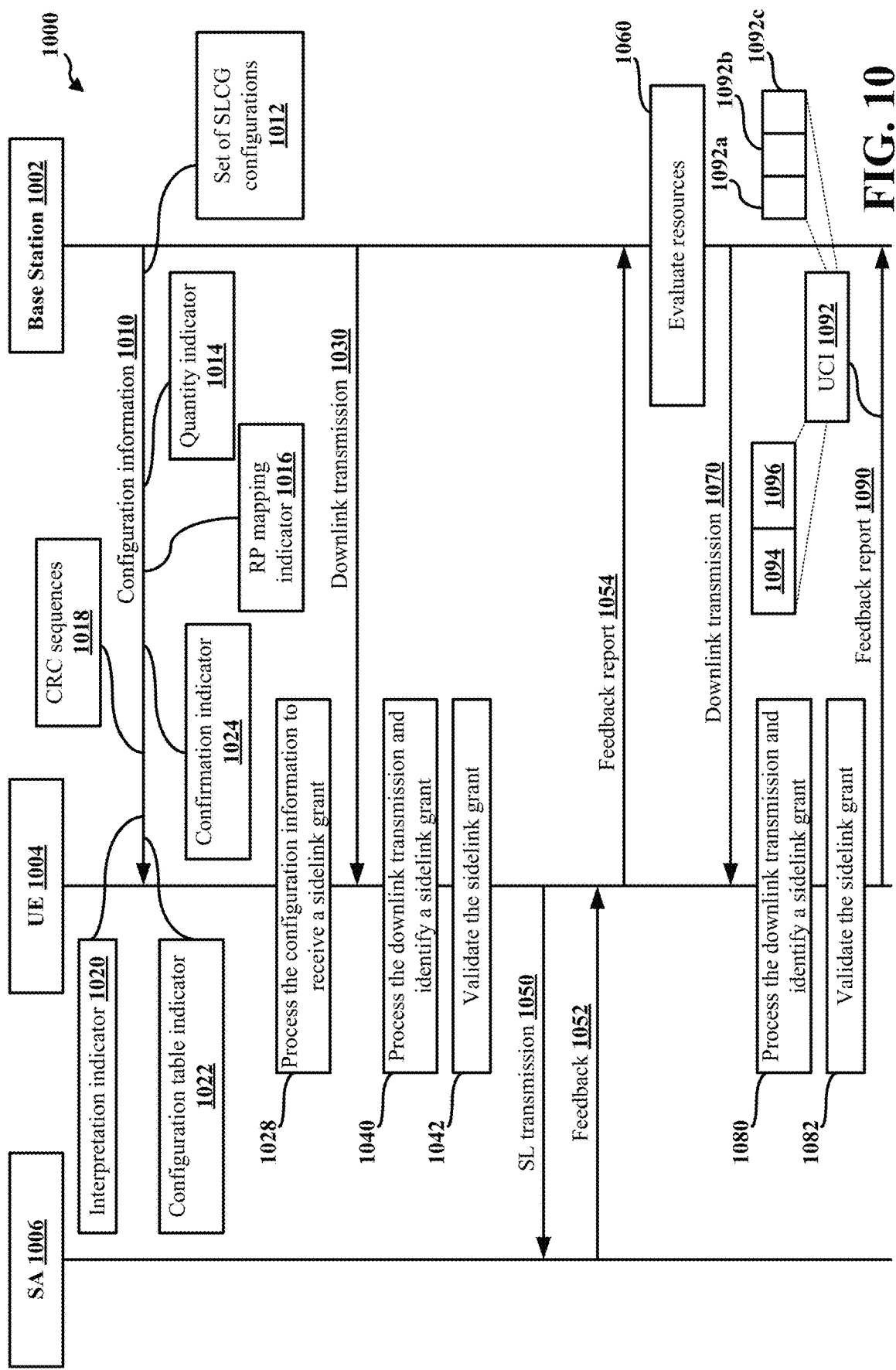
FIG. 10 illustrates an example communication flow between a base station, a UE, and a sensor/actuator (SA), in accordance with various aspects of the present disclosure.

FIG. 10 illustrates an example communication flow 1000 between a base station 1002, a UE 1004, and an SA 1006, as presented herein. In the illustrated example, the communication flow 1000 facilitates using an expanded set of configured grants in sidelink. For example, the UE 1004 may be configured with an expanded set of SLCG configurations, which may be activated to facilitate sidelink communication between the UE 1004 and the SA 1006. Aspects of the base station 1002 may be implemented by the base station 102/180 of FIG. 1, the base station 310 of FIG. 3, and/or the base station 902 of FIG. 9. Aspects of the UE 1004 may be implemented by the UE 104 of FIG. 1, the UE 350 of FIG. 3, and/or the PLC 904 of FIG. 9. Aspects of the SA 1006 may be implemented by the UE 104 of FIG. 1, the UE 350 of FIG. 3, and/or the SAs 906, 908, 910 of FIG. 9.

Although not shown in the illustrated example of FIG. 10, it may be appreciated that in additional or alternative examples, the base station 1002 may be in communication with one or more other base stations or UEs, the UE 1004 may be in communication with one or more other base stations or UEs, and/or the SA 1006 may be in communication with one or more other base stations or UEs. Additionally, while the example of FIG. 10 includes one SA, it may be appreciated that in additional or alternative examples, the UE 1004 may be in communication with a suitable quantity of SAs. For example, the UE 1004 may control n SAs, as described in connection with the example of FIG. 9.

In the illustrated example of FIG. 10, the UE 1004 operates as a controller for a suitable quantity of SAs. For example, the UE 1004 and the SA 1006 may be deployed in an IIoT environment. The UE 1004 and the SA 1006 may communicate using sidelink. The UE 1004 may receive sidelink resources for the sidelink communication from the base station 1002. For example, the UE 1004 may operate in the first resource allocation mode ("Mode 1") in which the base station 1002 assigns sidelink resources to the UE 1004 for sidelink communication.

The base station 1002 may transmit configuration information 1010 that is received by the UE 1004. The base station 1002 may transmit the configuration information 1010 via RRC signaling. In the illustrated example, the configuration information 1010 includes scheduling information for a set of SLCG configurations 1012. The set of SLCG configurations 1012 may include parameters for respective SLCGs of the set of SLCG configurations 1012. For example, the parameters may include a configuration index for identifying an SLCG, a time-frequency allocation for the sidelink resource associated with the SLCG, and a periodicity of the allocated sidelink resource associated with the SLCG. In the example of FIG. 10, the set of SLCG configurations 1012 include configurations for a quantity of SLCGs greater than eight SLCGs. That is, the quantity of SLCGs configured for the UE 1004 is greater than the quantity of SLCGs that may be indicated via the example DCI 800 of FIG. 8.

Figure 11:
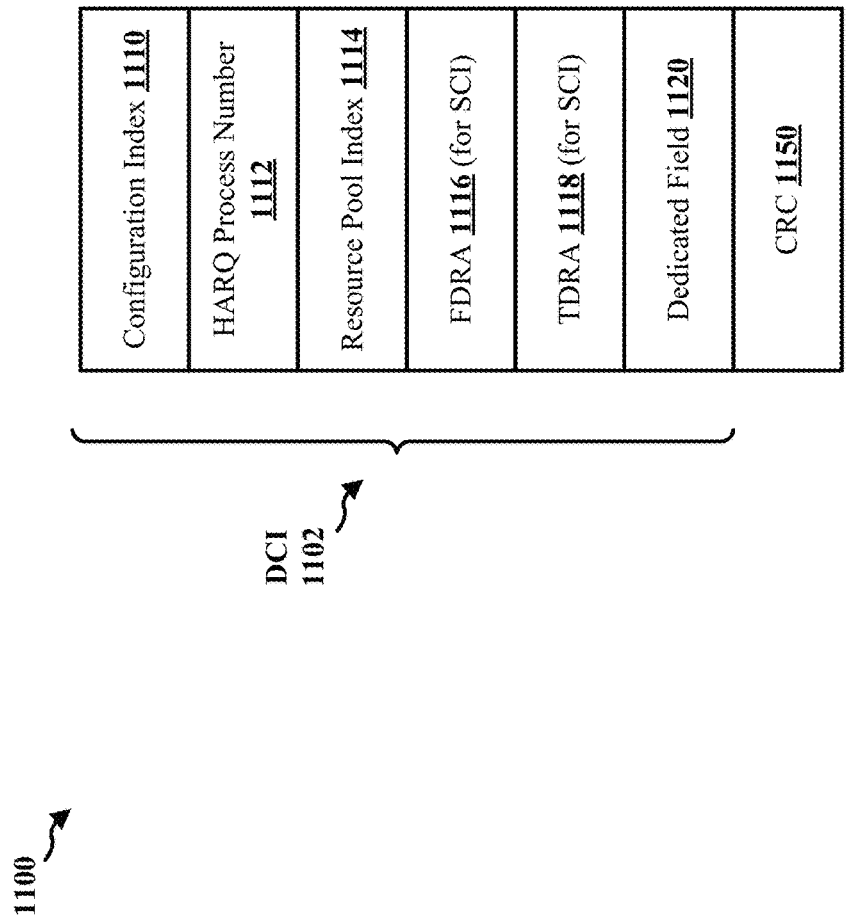
FIG. 11 illustrates an example downlink transmission, in accordance with various aspects of the present disclosure.

In the illustrated example of FIG. 10, the base station 1002 transmits a first downlink transmission 1030 that is received by the UE 1004. The example first downlink transmission 1030 may be associated with a sidelink grant. Aspects of the first downlink transmission 1030 may be implemented by an example downlink transmission 1100 of FIG. 11. In the illustrated example of FIG. 11, the downlink transmission 1100 includes DCI 1102 and a cyclic redundancy check (CRC) portion 1150. The example DCI 1102 may comprise DCI format 3_0. For example, the DCI 1102 may include a dynamic grant or may activate/deactivate a configured grant (e.g., CG type 2). The DCI 1102 may activate one or more SLCGs or may deactivate one or more SLCGs.

The example CRC portion 1150 may allow for error detection at the UE 1004. The CRC portion 1150 may comprise 24 bits that are added to the DCI 1102.

Referring again to the example of FIG. 10, at 1040, the UE 1004 processes the first downlink transmission 1030 and identifies a sidelink grant. In some examples, processing the first downlink transmission 1030 may include decoding the CRC portion of the first downlink transmission 1030. For example, the UE 1004 may apply a CRC scrambling sequence to decode the CRC portion 1150 of the downlink transmission 1100.

The sidelink grant identified by the UE 1004 may be a dynamic grant or an activation/deactivation of a configured grant. Referring to the example downlink transmission 1100 of FIG. 11, the UE 1004 may apply a CRC scrambling sequence to decode the DCI 1102 and then check the CRC portion to see if the decoding is correct or incorrect. The sidelink grant may correspond to a configured grant when a first scrambling sequence is used to decode the DCI 1102 and the CRC is valid. The sidelink grant may be a dynamic grant when a second scrambling sequence is used to decode the DCI 1102 and the CRC is valid.

After decoding the DCI 1102, the UE 1004 may determine a configuration index 1110 that may be zero or more bits. The configuration index 1110 may include zero bits when the UE 1004 is not configured to receive a configured grant. The configuration index 1110 may include more than zero bits when the UE 1004 is configured to receive a configured grant. When the UE 1004 is configured to receive a dynamic grant and is not configured to receive a configured grant, the size of the configuration index 1110 may be zero bits.

Referring again to the example of FIG. 10, at 1042, the UE 1004 validates the sidelink grant. Validating the sidelink grant enables the UE 1004 to reduce the decoding error of a dynamic grant being decoded as a configured grant. For example, after decoding the CRC portion of the first downlink transmission 1030, the UE 1004 may validate the scheduling activation or scheduling release of a configured grant based on the DCI.

As an example, the UE 1004 may apply a first CRC scrambling sequence to decode the CRC portion 1150 of the downlink transmission 1100 (e.g., at 1040). Based on the successful decoding of the CRC portion 1150 using the first CRC scrambling sequence, the UE 1004 may determine that the DCI 1102 is associated with a configured grant. The UE 1004 may then use other portions of the DCI 1102 to validate the sidelink grant. For example, the DCI 1102 includes a HARQ process number (HPN) 1112 and a frequency resource assignment (FDRA) 1116. The HPN 1112 may comprise four bits and indicate a quantity of HARQ processes configured for a dynamic grant. However, the HARQ processes may not be used for a configured grant. Thus, the bits of the HPN 1112 may be set to a configured (or specific) value when the downlink transmission 1100 corresponds to a configured grant and the value of the HPN 1112 may be used to validate a configured grant. The FDRA 1116 may indicate the frequency resource assignment for SCI (e.g., the first stage SCI).

The UE 1004 may check the HPN 1112 and the FDRA 1116 (if present) to validate the configured grant. To determine that the DCI 1102 is a valid activation of a configured grant, the UE 1004 checks if the bits of the HPN 1112 are all set to 0's. To determine that the DCI 1102 is a valid release of a configured grant, the UE 1004 check if the bits of the HPN 1112 are all set to 1's. If the DCI 1102 also includes the frequency resource assignment, the UE 1004 checks if the bits of the FDRA 1116 are all set to 1's. If validation is achieved, the UE 1004 considers the DCI 1102 as a valid activation or a valid release of a configured grant. If validation is not achieved based on the HPN 1112 and the FDRA 1116, the UE 1004 discards the DCI 1102.

Referring again to the example of FIG. 10, the UE 1004 validates the sidelink grant (e.g., at 1042). Additionally, in the example of FIG. 10, the UE 1004 considers the DCI as a valid activation of a configured grant. As shown in FIG. 10, the UE 1004 transmits a sidelink transmission 1050 that is received by the SA 1006. The UE 1004 may transmit the sidelink transmission 1050 via a sidelink data channel (e.g., PSSCH). Aspects of the sidelink transmission 1050 may be similar to the sidelink transmission 510 of FIG. 5. The UE 1004 may use the resources associated with the valid activation of the configured grant to transmit the sidelink transmission 1050.

In the illustrated example of FIG. 10, the UE 1004 receives feedback 1052 from the SA 1006. The UE 1004 may receive the feedback 1052 via a sidelink feedback channel (e.g., PSFCH). The feedback 1052 may indicate whether the SA 1006 successfully processed the sidelink transmission 1050. For example, the feedback 1052 may comprise an ACK when the SA 1006 successfully processes the sidelink transmission 1050. The feedback 1052 may comprise a NACK when the SA 1006 is unable to process the sidelink transmission 1050.

The UE 1004 transmits a feedback report 1054 that is received by the base station 1002. The feedback report 1054 may include HARQ-ACK feedback based on the feedback 1052 received from the SA 1006. The HARQ-ACK feedback may be beneficial in enabling the base station 1002 to schedule resources for transmissions or retransmissions. The feedback report 1054 may also include feedback acknowledging receipt of DCI by the UE 1004. For example, the UE 1004 may transmit an ACK when the UE 1004 successfully receives the DCI 1102 of FIG. 11. The feedback acknowledging receipt of DCI may be beneficial in enabling the base station 1002 to determine whether to re-transmit the DCI with increased power.

In some examples, the HARQ-ACK feedback may be transmitted as UCI in PUCCH or PUSCH. In some examples, the feedback acknowledging receipt of DCI may be transmitted using a MAC-control element (MAC-CE). In some examples, the feedback acknowledging receipt of DCI may comprise a bitmap for SLCG confirmation. In some examples, the UE 1004 waits for a scheduled uplink data channel (e.g., PUSCH) to transmit the feedback acknowledging receipt of DCI. It may be appreciated that waiting for a PUSCH to transmit the feedback report 1054 may increase latency as the UE 1004 may not be scheduled with PUSCH to transmit a MAC-CE.

At 1060, the base station 1002 may evaluate the resources allocated for sidelink transmissions based on the feedback report 1054. For example, the feedback report 1054 may inform whether the sidelink transmissions of the last allocated sidelink resources were successful or unsuccessful. After receiving the feedback report 1054, the base station 1002 may evaluate whether to allocate new or different sidelink resources to the UE 1004.

In the illustrated example of FIG. 10, the base station 1002 transmits a downlink transmission 1070 that is received by the UE 1004. Aspects of the downlink transmission 1070 may be similar to the first downlink transmission 1030.

At 1080, the UE 1004 processes the downlink transmission 1070 and identifies a sidelink grant. Aspects of processing the downlink transmission 1070, at 1040, may similar to the processing of the first downlink transmission 1030 at 1040.

At 1082, the UE 1004 validates the sidelink grant associated with the sidelink grant. Aspects of validating the sidelink grant, at 1082, may be similar to the validating of the sidelink grant at 1042.

In the example of FIG. 10, the UE 1004 may process the downlink transmission 1070 (e.g., at 1080) by applying a CRC scrambling sequence associated with a configured grant. At 1082, the UE 1004 may validate the corresponding DCI based on the HPN and the frequency resource assignment (if present). For example, the UE 1004 may determine that the corresponding DCI is a valid release of a configured grant indicated by the configuration index 1110. The example UE 1004 may transmit a feedback report 1090 that is received by the base station 1002. Aspects of the feedback report 1090 may be similar to the feedback report 1054.

As described above, the example techniques disclosed herein enable the use of an expanded set of sidelink configured grants. An expanded set of sidelink configured grants may be beneficial in certain environments, such as an IIoT deployment in which a PLC may be in control of and communicate with a large number of SAs. However, the limited number of bits of the configuration index (e.g., the three bits for a configured grant, as described in connection with the configuration index 810 of FIG. 8) limits the number the of sidelink configured grants that are available for sidelink.

In a first aspect, examples provide techniques for the DCI to indicate a configured grant that is included in the expanded set of configured grant configurations. That is, example techniques provide increased support of sidelink configured grants.

In some examples, the increased support of sidelink configured grants may be performed by increasing the number of bits allocated to the configuration index in the DCI. For example, and referring to the example of FIG. 11, the DCI 1102 of the downlink transmission 1100 may include the configuration index 1110. The size of the configuration index 1110 may be greater than three bits to accommodate more than eight sidelink configured grants. For example, if the set of SLCG configurations 1012 includes 50 SLCG configurations, then the size of the configuration index 1110 may be increased to six bits to represent the 50 different SLCG configurations.

In some examples, the number of bits of the configuration index 1110 may be configured via RRC signaling. For example, and referring to the example of FIG. 10, the configuration information 1010 may include a quantity indicator 1014 ("sl-CG-ConfigNum"). In some examples, the quantity indicator 1014 is UE-specific. The quantity indicator 1014 may indicate a quantity of bits of the configuration index 1110 (e.g., six bits). In other examples, the quantity indicator 1014 may indicate a quantity of configured SLCGs. For example, the quantity indicator 1014 may indicate that the set of SLCG configurations 1012 includes 50 SLCG configurations.

At 1028, the UE processes the configuration information 1010 to receive a sidelink grant. For example, the UE 1004 may determine, based on the quantity indicator 1014, the number of bits of the configuration index 1110. For example, the quantity indicator 1014 may indicate the set of SLCG configurations 1012 comprises 50 SLCG configurations.

The UE 1004 may then determine, at 1028, that the configuration index 1110 comprises six bits to accommodate the 50 SLCG configurations.

In some examples, if the quantity indicator 1014 is absent or not included in the configuration information 1010, the UE 1004 may determine, at 1028, that the set of SLCG configurations 1012 comprises a default quantity of SLCG configurations, such as eight SLCG configurations. The UE 1004 may then determine that the configuration index 1110 comprises three bits to accommodate the eight SLCG configurations.

In some examples, when the configuration index 1110 comprises extra bits (e.g., is greater than three bits), the additional bits may be used from reserved bits of the DCI 1102. In other examples, the DCI 1102 may include a new field to accommodate the extra bits.

In some examples, the increased support of sidelink configured grants may be performed by combining other fields (or codepoints) with the configuration index. That is, disclosed techniques may repurpose one or more fields of the DCI to expand the size of the configuration index.

For example, the UE 1004 may be configured to combine the HARQ process number with the configuration index. Referring to the example of FIG. 11, the HPN 1112 may comprise four bits and the configuration index 1110 may comprise three bits. In such examples, combining the HPN and the configuration index results in seven bits, which may be used to indicate 128 SLCG configurations. As described above, the HPN 1112 is used to indicate HARQ processes for a dynamic grant. Thus, when a sidelink grant is for a configured grant, the HPN 1112 may be used with the configuration index to indicate the quantity of SLCG configurations.

In some examples, the UE 1004 may leverage the resource pool index of DCI to expand the size of the configuration index. For example, and referring to the example of FIG. 11, the DCI 1102 may include a resource pool index 1114. The size of the resource pool index 1114 may depend on the total number of resource pools. For example, the size of the resource pool index 1114 may be determined by $\log_2 I$, where the parameter "I" is the number of resource pools configured for transmission. In some examples, the parameter "I" may be configured by a higher layer parameter ("sl-TxPool Scheduling").

To leverage the resource pool index 1114 for indicating the configuration index, the UE 1004 may be configured to use virtual pools that map to the same physical resource pool. For example, and referring again to the example of FIG. 10, the configuration information 1010 may include a resource pool (RP) mapping indicator 1016. The RP mapping indicator 1016 may map virtual resource pools to physical resource pools. In such example, the virtual resource pools may be indicated by the resource pool index of DCI. For example, the RP mapping indicator 1016 may map a first RP index (e.g., a first virtual pool) and a second RP index (e.g., a second virtual pool) to a same physical resource pool.

In some examples, the RP mapping indicator 1016 may also indicate an offset when determining an SLCG based on the configuration index. For example, the first resource pool (e.g., the first virtual pool) may indicate an offset of zero when calculating the configuration, the second resource pool (e.g., the second virtual pool) may indicate an offset of eight when calculating the configuration, etc.

In some examples, the RP mapping indicator 1016 may indicate a subset of SLCG of the set of SLCG configurations 1012 that map to a resource pool codepoint. For example, the first resource pool (e.g., the first virtual pool) may map to SLCG configurations 1 to 8, the second resource pool (e.g., the second virtual pool) may map to SLCG configurations 17 to 24, etc.

The UE 1004 may process, at 1028, the RP mapping indicator 1016 to facilitate receiving a sidelink grant. For example, when the resource pool index 1114 indicates the first resource pool, the UE 1004 may determine that the codepoint of the configuration index 1110 represents SLCG configurations 1 to 8. When the resource pool index 1114 indicates the second resource pool, the UE 1004 may determine that the codepoint of the configuration index 1110 represents SLCG configurations 9 to 16. Thus, based on the size of the resource pool index 1114 and the number of virtual pools that may be indicated by the resource pool index 1114, the resource pool index and the configuration index may be used to indicate an expanded set of sidelink configured grants.

In some examples, the configuration may be indicated by combining the configuration index codepoint with a resource allocation codepoint. For example, and referring to the example downlink transmission 1100 of FIG. 11, the DCI 1102 may include a frequency resource assignment (FDRA) 1116 and a time resource assignment (TDRA) 1118. The FDRA 1116 and the TDRA 1118 may be used for SCI. However, the frequency resource assignment and/or the time resource assignment may comprise unspecified values. For example, when the TDRA 1118 is used to indicate three reservations, the TDRA 1118 may be nine bits, as shown in the example first stage SCI 600 of FIG. 6. However, certain of the TDRA codepoints (sometimes referred to as time-domain resource indication value (TRIV)) may be unused or unspecified for indication of a resource reservation. In such examples, the TDRA codepoint or the FDRA codepoint (sometimes referred to a frequency-domain resource indication value (FRIV)) and the configuration index may be used to indicate the SLCG. Such resource assignment codepoints may sometimes be referred to as "special" resource assignment codepoints or "special" resource indication values.

In some examples, the increased support of sidelink configured grants may be performed based on CRC scrambling. That is, disclosed techniques may map different SLCG configurations to different CRC scrambling sequences.

For example, the UE 1004 may be configured with different CRC scrambling sequences that may be used to decode the CRC portion of the downlink transmission. Referring to the example of FIG. 11, the CRC portion 1150 of the downlink transmission 1100 may be scrambled using different sequences. In such examples, the CRC scrambling sequence used to decode the CRC portion 1150 may indicate how to determine the SLCG indicated by the downlink transmission.

For example, and referring again to the example of FIG. 10, the configuration information 1010 may include CRC sequences 1018. The CRC sequences 1018 may be used to decode the CRC portion 1150 of the downlink transmission 1100. Additionally, the different CRC sequences 1018 may indicate different subsets of the SLCG configurations. For example, a first CRC sequence may map to SLCG configurations 1 to 8, a second CRC sequence may map to SLCG configurations 17 to 24, etc.

The UE 1004 may process, at 1028, the CRC sequences 1018 to facilitate receiving a sidelink grant. For example, when the UE 1004 decodes the CRC portion 1150 using the first CRC sequence, the UE 1004 may determine that the codepoint of the configuration index 1110 represents SLCG configurations 1 to 8. When the UE 1004 decodes the CRC portion 1150 using the second CRC sequence, the UE 1004 may determine that the codepoint of the configuration index 1110 represents SLCG configurations 17 to 24. Thus, different CRC sequences and the configuration index may be used to indicate an expanded set of sidelink configured grants. In some examples, the CRC sequence used to decode the CRC portion 1150 may indicate a most significant bit (MSB) of the configuration index or a least significant bit (LSB) of the configuration index.

Although the above examples describe indicating a single configuration, it may be appreciated that the disclosed techniques facilitate joint SLCG activation and release. For example, in a second aspect, examples provide techniques for indicating two or more SLCGs via a single downlink transmission.

In some examples, a bitmap may be used to employ joint SLCG activation and release. For example, the UE 1004 may process the configuration index of the DCI as a bitmap in which each bit indicates a different SLCG. In other examples, the UE 1004 may process the configuration index of the DCI as an index (e.g., by converting the configuration index codepoint to a decimal).

In the illustrated example of FIG. 10, the configuration information 1010 may include an interpretation indicator 1020. The interpretation indicator 1020 may indicate whether the UE 1004 is to process the configuration index as a bitmap or as an index. At 1028, the UE 1004 may process the interpretation indicator 1020 to facilitate receiving a sidelink grant. For example, when the interpretation indicator 1020 is set to a first value, the UE 1004 may process the configuration index as a bitmap. When the interpretation indicator 1020 is set to a second value, the UE 1004 may process the configuration index as an index. It may be appreciated that when the UE 1004 is configured to process the configuration index as an index (e.g., a decimal), then the configuration index may indicate a single SLCG.

For example, combining the HPN 1112 (e.g., four bits) and the configuration index 1110 (e.g., three bits) provides an expanded configuration index comprising seven bits that may be used to indicate an SLCG configuration. When the UE 1004 is configured to process the expanded configuration index as an index (e.g., based on the interpretation indicator 1020 set to the second value), then the UE 1004 may identify one SLCG configuration (e.g., one of SLCG configurations 1 to 128). For example, the expanded configuration index may comprise the bits "0011010." The UE 1004 may identify the SLCG configuration 26 based on the expanded configuration index.

When the UE 1004 is configured to process the seven bits as a bitmap (e.g., based on the interpretation indicator 1020 set to the first value), then the seven bits may correspond to seven different SLCG configurations. For example, based on the expanded configuration index "0011010," the UE 1004 may identify SLCG configurations 3, 4, 6 for activation or release.

In some examples, the interpretation indicator 1020 may configure each of the bits to a respective SLCG configuration. For example, the interpretation indicator 1020 may indicate that the first three bits of the expanded configuration index map to SLCG configurations 1 to 3 and the next four bits of the expanded configuration index map to SLCG configurations 10 to 13. In some examples, the interpretation indicator 1020 may configure different mappings between the bits and the respective SLCG configurations. For example, a first value of the interpretation indicator 1020 (when the UE 1004 is configured to process the expanded configuration index as a bitmap) may map the bits of the expanded configuration index to a first subset of SLCG configurations (e.g., the SLCG configurations 1 to 8), a second value of the interpretation indicator 1020 may map the bits of the expanded configuration index to a second subset of SLCG configurations (e.g., the SLCG configurations 9 to 16), etc.

In some examples, a configuration table may be employed for joint SLCG activation and release. For example, the UE 1004 may map the configuration index of the DCI to an entry in a configuration table. The configuration table may support the activation/release of a single SLCG configuration and/or joint SLCG configurations. For example, a first entry of the configuration table may indicate the activation/release of a single SLCG configuration, and a second entry of the configuration table may indicate the activation/release of two or more SLCG configurations.

Figure 12:
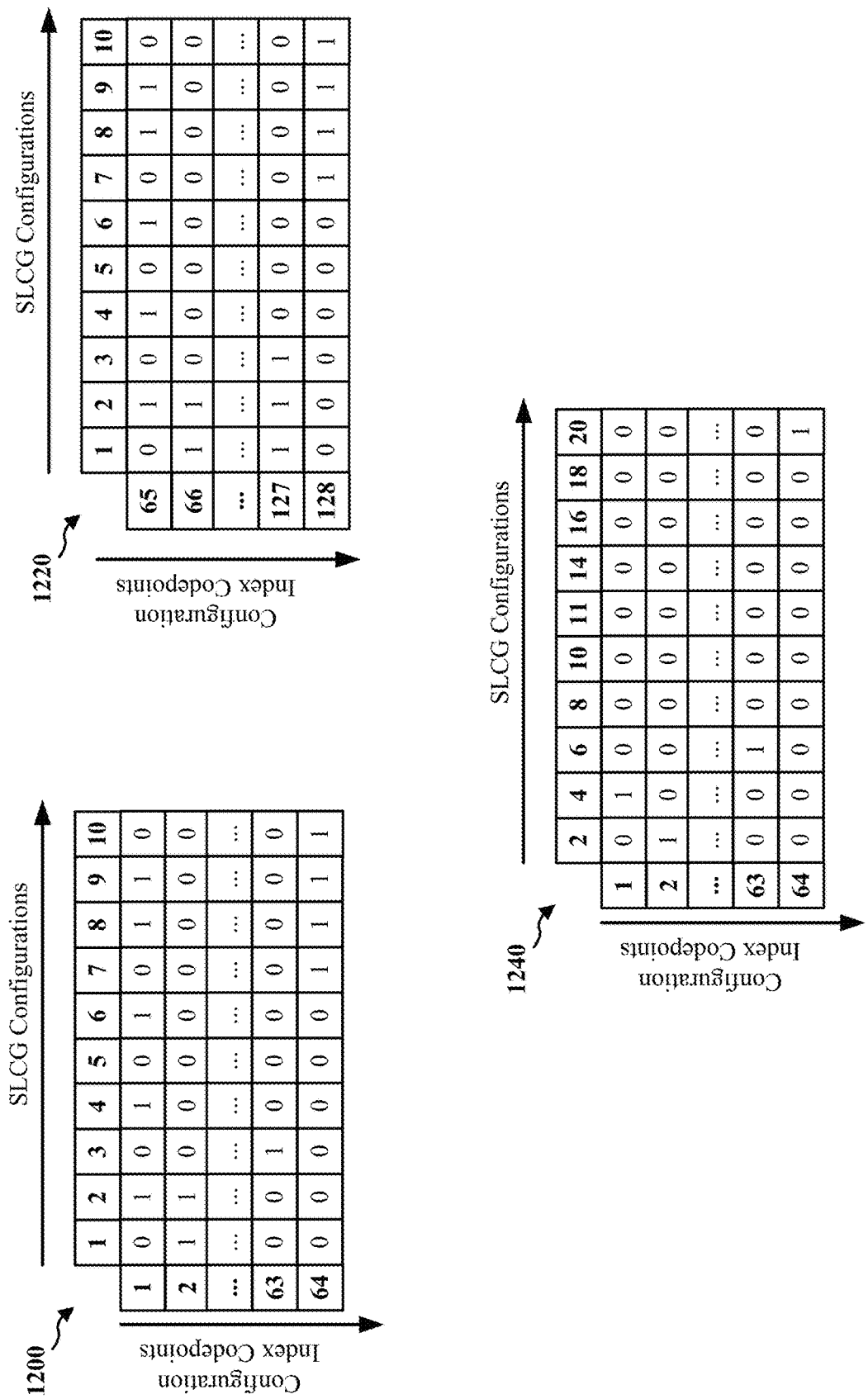
FIG. 12 illustrates example configuration tables that may be configured by a configuration table indicator, in accordance with various aspects of the present disclosure.

Referring again to the example of FIG. 10, the configuration information 1010 may include a configuration table indicator 1022. The configuration table indicator 1022 may configure the UE 1004 with one or more configuration tables that map configuration index codepoints to different combinations of one or more SLCG configurations. FIG. 12 illustrates example configuration tables 1200, 1220, 1240 that may be configured by the configuration table indicator 1022. In the example configuration tables 1200, 1220, 1240, the configuration index codepoints are indicated along the vertical axis and the SLCG configurations associated with the respective configuration table are indicated along the horizontal axis. However, it may be appreciated that other examples may employ additional or alternative techniques for implementing the mappings between the configuration index codepoints and the SLCG configurations.

As shown in FIG. 12, the different configuration tables 1200, 1220, 1240 map different configuration index codepoints to different SLCG configuration(s). For example, in a first example configuration table 1200, the configuration index codepoint "1" identifies the joint activation/release of SLCG configurations 2, 4, 6, 8, and 9. The configuration index codepoint "63" identifies the activation/release of a single SLCG configuration 3. In a second example configuration table 1220, the respective configuration index codepoints each map to joint SLCG configurations. In a third example configuration table 1240, the respective configuration index codepoints each map to a single SLCG configuration. It may be appreciated that the example configuration tables 1200, 1220, 1240 of FIG. 12 are merely illustrative and that other examples may include additional or alternative combinations of configuration index codepoints to SLCG configurations.

Referring again to the example of FIG. 10, the configuration table indicator 1022 may indicate one or more configuration tables. The configuration table indicator 1022 may additionally or alternatively activate one or more of the configuration tables. For example, a first value of the configuration table indicator 1022 may activate the first example configuration table 1200 of FIG. 12, a second value of the configuration table indicator 1022 may activate the first and second example configuration tables 1200, 1220 of FIG. 12, etc. In some examples, the configuration table indicator 1022 may provide an association between the configuration index of the DCI of the first downlink transmission 1030 to a configuration table.

At 1028, the UE 1004 may process the configuration table indicator 1022 to facilitate the receiving of a sidelink grant. For example, based on the configuration table indicator 1022, the UE 1004 may activate one or more configuration tables, may determine a mapping between a configuration index of the DCI to a configuration table, etc.

In some examples, resource allocation codepoints may be employed for joint SLCG activation and release. For example, and referring to the example downlink transmission 1100 of FIG. 11, the DCI 1102 may include the frequency resource assignment (FDRA) 1116 and/or the time resource assignment (TDRA) 1118. The FDRA 1116 and the TDRA 1118 may be used for SCI. As described above, in some examples, the frequency resource assignment and/or the time resource assignment may comprise unspecified values. In such examples, the TDRA codepoint or the FDRA codepoint and the configuration index may be used to indicate single or joint SLCG activation/release. For example, the TDRA codepoint may be set to all ones, which may indicate a joint activation of all SLCG configurations. It may be appreciated that other examples may use additional or alternative combinations of TDRA codepoints and/or FDRA codepoints to map to SLCG configurations.

In some examples, the TDRA codepoints and/or the FDRA codepoints may operate similar to the interpretation indicator 1020 of FIG. 10. For example, a first set of TDRA codepoints and/or FDRA codepoints may cause the UE 1004 to process a configuration index as an index, and a second set of TDRA codepoints and/or FDRA codepoints may cause the UE 1004 to process the configuration index as a bitmap. It may be appreciated that the first set of TDRA codepoints and/or FDRA codepoints may comprise one or more codepoints, and that the second set of TDRA codepoints and/or FDRA codepoints may comprise one or more codepoints.

In some examples, CRC scrambling sequences may be employed for joint SLCG activation and release. For example, and referring to the example of FIG. 10, the configuration information 1010 may include the CRC sequences 1018. In some examples, different CRC sequences 1018 may indicate single or joint SLCG activation/release. For example, using a first CRC sequence to successfully decode the CRC portion 1150 of the DCI 1102 may cause the UE 1004 to process a configuration index as a single SLCG activation/release, and using a second CRC sequence may cause the UE 1004 to process the configuration index as a joint SLCG activation/release.

In some examples, the CRC sequences 1018 may operate similar to the interpretation indicator 1020 of FIG. 10. For example, using a first CRC sequence to successfully decode the CRC portion 1150 of the DCI 1102 may cause the UE 1004 to process a configuration index as an index, and using a second CRC sequence may cause the UE 1004 to process the configuration index as a bitmap.

In some examples, a dedicated field of the DCI may be employed for joint SLCG activation and release. For example, and referring to the example downlink transmission 1100 of FIG. 11, the DCI 1102 may include a dedicated field 1120. In some examples, the dedicated field 1120 may refer to reserved bits of the DCI 1102. In other examples, the dedicated field 1120 may refer to new bits added to the DCI 1102. The dedicated field 1120 may indicate whether the configuration index is associated with a single SLCG activation/release or a joint SLCG activation/release. For example, a first codepoint of the dedicated field 1120 may cause the UE 1004 to process a configuration index as a single SLCG activation/release, and a second codepoint of the dedicated field 1120 may cause the UE 1004 to process the configuration index as a joint SLCG activation/release.

In examples, the dedicated field 1120 may operate similar to the interpretation indicator 1020 of FIG. 10. For example, a first codepoint of the dedicated field 1120 of the DCI 1102 may cause the UE 1004 to process a configuration index as an index, and a second codepoint of the dedicated field 1120 may cause the UE 1004 to process the configuration index as a bitmap.

In some examples, the UE 1004 may use the different codepoints of the DCI of the downlink transmission to determine the configuration. For example, the resource allocations (e.g., the FDRA 1116 and/or the TDRA 1118) may indicate that one or more SLCG configurations are being activated/released, the CRC scrambling sequence used to decode the CRC portion 1150 may indicate the subset of SLCG configurations, and the configuration index (or the expanded configuration index when combined with another field) may indicate the actual SLCG configuration.

Referring again to the example of FIG. 10, after the UE 1004 processed a downlink transmission (e.g., at 1040 and/or 1080), the UE 1004 validates the sidelink grant. As described above, the UE 1004 may validate a configured grant based on the HPN and the frequency resource assignment (if present). In a third aspect, examples disclosed herein provide techniques for enhanced sidelink grant validation. For example, disclosed techniques facilitate the false interpretation or decoding of a dynamic grant as a configured grant.

The downlink control information may be used for dynamic grants and for configured grants. For example, and referring to the example of FIG. 11, the DCI 1102 may be associated with a dynamic grant or a configured grant. When the DCI 1102 is associated with a dynamic grant, the size of the configuration index 1110 may be set to zero bits. Example techniques disclosed herein may allocate a subset of codepoints for the configuration index 1110 to use for dynamic grant validation.

For example, when processing the first downlink transmission 1030 (e.g., at 1040), the UE 1004 may identify a dynamic grant. For example, based on the CRC scrambling sequence used to decode the CRC portion 1150, the UE 1004 may determine that the DCI 1102 is associated with a dynamic grant. The UE 1004 may then validate the dynamic grant, at 1042, based on the codepoint of the configuration index 1110. To determine that the DCI 1102 is a valid dynamic grant, the UE 1004 checks if the codepoint of the configuration index 1110 matches a configuration index configured for dynamic grant validation. If validation is achieved, the UE 1004 considers the DCI 1102 as a valid dynamic grant. If validation is not achieved, the UE 1004 discards the DCI 1102.

The configuration index (or indices) configured for dynamic grant validation may be based on the quantity of SLCGs of the set of SLCG configurations 1012. For example, to determine the size of the configuration index 1110, Equation 1 (below) may be applied.

$$\text{Number of bits} = \lceil \log_2(\text{ConfigNum}) \rceil \quad \text{Equation 1:}$$

In equation 1, the parameter "ConfigNum" refers to the quantity of SLCGs of the set of SLCG configurations 1012 ("sl-CG-ConfigNum"). As shown in Equation 1, the number of bits of the configuration index 1110 may be determined by applying the ceiling function to the log function of Equation 1. For example, if the quantity of SLCGs is 50, applying Equation 1 to the 50 SLCGs results in a configuration index 1110 of six bits. However, due to the ceiling function, there may be one or more configuration index codepoints that are unspecified or unassociated with an SLCG configuration. For example, the configuration index 1110 of six bits results in 64 codepoints may be indicated by the configuration index 1110. However, since there are 50 SLCGs in the example, there are 14 codepoints that are unspecified or unassociated with an SLCG configuration (e.g., the codepoints 51 to 64). In such examples, one or more of the extra codepoints (e.g., the codepoints 51 to 64) may be configured to use for dynamic grant validation.

Thus, after processing the downlink transmission and identifying a dynamic grant (e.g., at 1040), if the configuration index codepoint of the DCI 1102 does not match one of the dynamic grant validation codepoints, the UE 1004 may discard the DCI 1102. If the UE 1004 determines, at 1042, that the configuration index codepoint of the DCI 1102 matches one of the dynamic grant validation codepoints, the UE 1004 may determine that the DCI 1102 is a valid dynamic grant. In such examples, the UE 1004 may use the sidelink resources indicated by the DCI 1102 to transmit a sidelink transmission to the SA 1006, as described above in connection with the sidelink transmission 1050.

It may be appreciated that the above technique for validating a dynamic grant may also be used to indirectly validate a configured grant. For example, since a subset of the configuration index codepoints that may be configured for the dynamic grant validation are based on extra (e.g., unspecified) codepoints, if the UE 1004 determines that the DCI 1102 is associated with a configured grant, the UE 1004 may determine the DCI 1102 as a valid activation/release of a configured grant by checking if the configuration index codepoint of the DCI 1102 matches one of the specified codepoints (e.g., one of the codepoints included in the set of SLCG configurations 1012). If the configuration index codepoint matches a specified codepoint, the UE 1004 may determine that the DCI 1102 is a valid activation/release of an indicated configured grant. If the configuration index codepoint matches an unspecified codepoint (e.g., does not match a specified codepoint), then the UE 1004 may discard the DCI 1102.

Thus, it may be appreciated that the above technique may be beneficial in reducing the error probability of a dynamic grant being decoded as a configured grant, and of a configured grant being decoded as a dynamic grant.

In some examples, the UE 1004 may apply additional or alternative techniques for validating a configured grant. For example, as described above, in some examples, an expanded configuration index may be formed by combining the configuration index codepoint of the DCI 1102 and the HPN 1112 of the DCI 1102. In such examples, the UE 1004 may be unable to use the HPN codepoint for performing the configured grant validation.

In some examples, the UE 1004 may use the resource allocations of the DCI to perform the configured grant validation. For example, and referring to the example of FIG. 11, the DCI 1102 may include a frequency resource allocation (e.g., the FDRA 1116) and/or a time resource allocation (e.g., the TDRA 1118). As described above, one or more TDRA codepoints (TRIV) and/or FDRA codepoints (FRIV) may be unspecified (e.g., "special" resource allocation codepoints or "special" RIV). For example, when the TDRA 1118 comprises nine bits indicating three reservations (as described above in connection with the first stage SCI 600 of FIG. 6A), there may be 15 TDRA codepoints that are unused for resource reservation. With respect to the FDRA 1116, there may be more than 1000 FDRA codepoints that are unused for resource reservation, for example, when there is a large number of sub-channels per resource pool.

In such examples, the UE 1004 may repurpose the unspecified resource assignment codepoints for sidelink grant validation (e.g., at 1042 and/or 1082). For example, a first set of the unspecified resource assignment codepoints (e.g., unspecified TRIV and/or FRIV) may be allocated for configured grant validation and a second set of the unspecified resource assignment codepoints may be allocated for dynamic grant validation. The first set and the second set of the unspecified resource assignment codepoints may be include one or more codepoints.

For example, at 1040, the UE 1004 may process the first downlink transmission 1030 and identify that the DCI is associated with a sidelink grant (e.g., a dynamic grant or a configured grant). At 1042, the UE 1004 may validate the sidelink grant by comparing the resource assignment codepoint of the DCI to the respective set of unspecified resource assignment codepoints. If the resource assignment codepoint is consistent with the respective set of unspecified resource assignment codepoints, then the UE 1004 validates the DCI. Otherwise, the UE 1004 discards the DCI. For example, if the UE, at 1040, identifies that the DCI 1102 is associated with a configured grant, the UE 1004 may compare the resource assignment codepoint of the FDRA 1116 and/or the TDRA 1118 to the resource assignment codepoints of the first set of the unspecified resource assignment codepoints. If the UE 1004 successfully matches the resource assignment codepoint of the DCI 1102 to a resource assignment codepoint of the first set of the unspecified resource assignment codepoints, the UE 1004 validates the DCI 1102 as a valid activation/release of one or more indicated SLCGs. Otherwise, the UE 1004 may discard or forego further processing of the DCI 1102.

In other examples, if the UE, at 1040, identifies that the DCI 1102 is associated with a dynamic grant, the UE 1004 may compare the resource assignment codepoint of the FDRA 1116 and/or the TDRA 1118 to the resource assignment codepoints of the second set of the unspecified resource assignment codepoints. If the UE 1004 successfully matches the resource assignment codepoint of the DCI 1102 to a resource assignment codepoint of the second set of the unspecified resource assignment codepoints, the UE 1004 validates the DCI 1102 as a valid dynamic grant. Otherwise, the UE 1004 may discard or forego further processing of the DCI 1102.

Referring again to FIG. 10, in some examples, the UE 1004 may transmit feedback reports 1054, 1090 that are received by the base station 1002. The feedback reports 1054, 1090 may comprise SLCG confirmation. As described above, in some examples, the UE 1004 may transmit the feedback reports using a MAC-CE. For example, the feedback report 1090 may comprise an 8-bit MAC-CE for the SLCG confirmation. In such examples, each bit of the 8-bit MAC-CE may represent the activation/release of an SLCG configuration.

However, transmitting the SLCG confirmation (e.g., feedback acknowledging receipt of DCI) using a MAC-CE may introduce latency. For example, a MAC-CE may be transmitted using scheduled PUSCH. However, in an IIoT deployment, there may be relatively little uplink and downlink traffic between the UE and the base station. Instead, the traffic may be at the UE and the communication may be sidelink with the SAs. Since there may be limited uplink/downlink traffic between the UE and the base station, the base station may schedule the UE with sidelink resources, but may not schedule the UE with uplink resources, or may schedule the UE with uplink resources with less frequency than, for example, the scheduling of sidelink resources. In such examples, the UE may wait to transmit the SLCG confirmation until the UE is scheduled with PUSCH. However, such a delay introduces latency in reporting the SLCG confirmation to the base station.

In a fourth aspect, examples disclosed herein provide techniques for improving SLCG confirmation for activation/release. For example, disclosed techniques facilitate transmitting the SLCG confirmation for activation/release via uplink control information (UCI). UCI can be carried on PUCCH or PUSCH. As a result, using UCI may reduce latency and provide faster SLCG confirmation as the UE is not relaying the scheduling of PUSCH to transmit the SLCG confirmation. Additionally, the UE may transmit the HARQ-ACK feedback from the SA with the SLCG confirmation via UCI.

Referring to the example of FIG. 10, the feedback report 1090 may comprise UCI 1092 including the SLCG confirmation for activation/release. The UCI 1092 may be transmitted via PUCCH or PUSCH. In some examples, the UE 1004 may be configured to include HARQ feedback and the activation/release status of SLCG configurations in the UCI 1092. For example, the example configuration information 1010 may include a confirmation indicator 1024 that may configure the UE 1004 to transmit HARQ feedback for sidelink transmissions and the activation/release status of SLCG configurations.

As an example, the UE 1004 may forego the transmitting of the feedback report 1054 and may transmit the feedback report 1090. In the example of FIG. 10, the UE 1004 receives the first downlink transmission 1030 associated with a sidelink grant (e.g., an activation of a configured grant) that the UE 1004 may use to transmit the sidelink transmission 1050 to the SA 1006. The UE 1004 also receive feedback 1052 from the SA 1006. The feedback 1052 may comprise HARQ feedback and may indicate whether the SA 1006 successfully processed the sidelink transmission 1050. The UE also receives the second downlink transmission 1070 that is associated with a sidelink grant (e.g., a release of a configured grant). The UE 1004 may generate the UCI 1092 based on the sidelink grant associated with the first downlink transmission 1030, the feedback 1052, and sidelink grant associated with the second downlink transmission 1070. For example, the UCI 1092 may include three sections where each section is associated with a respective one of the sidelink grant associated with the first downlink transmission 1030, the feedback 1052, and sidelink grant associated with the second downlink transmission 1070. For example, the UCI 1092 may include a first section 1092*a* that indicates confirmation of the first downlink transmission 1030, a second section 1092*b* that indicates the HARQ feedback for the sidelink transmission 1050, and a third section that indicates confirmation of the second downlink transmission 1070. In some examples, the size of the first section 1092*a* and the third section 1092*c* may depend on the size of the configuration index 1110. The size of the second section 1092*b* may be one bit to indicate an ACK or NACK related to the sidelink transmission 1050.

In some examples, the UE 1004 may be configured to include HARQ feedback in the UCI 1092. For example, the confirmation indicator 1024 may configure the UE 1004 to transmit HARQ feedback for sidelink transmissions. In such examples, the UCI 1092 may not include a mapping to the SLCG configurations. For example, and with respect to the above example, the UCI 1092 may include the second section 1092*b* associated with the sidelink transmission 1050. However, the UCI 1092 may not include the first section 1092*a* and the third section 1092*c,* which may be associated with the sidelink grants associated with the first downlink transmission 1030 and the second downlink transmission 1070, respectively.

In some examples, the UE 1004 may be configured to include HARQ feedback and the status of a subset of SLCG configurations in the UCI 1092. For example, the confirmation indicator 1024 may configure the UE 1004 to transmit HARQ feedback for sidelink transmissions and to transmit the status of the subset set of SLCG configurations. The UE 1004 may transmit the status of the set of SLCG configurations via a bitmap. For example, the UCI 1092 may include a HARQ feedback section 1094 and a bitmap 1096. The UE 1004 may append the bitmap 1096 to the HARQ feedback section 1094.

The bitmap 1096 may comprise a bit to indicate the status of each SLCG configuration included in the subset of SLCG configurations. In some examples, the subset of SLCG configurations may comprise all of the SLCG configurations of the set of SLCG configurations 1012. In such examples, the bitmap 1096 may comprise a bit for each of the SLCG configurations of the set of SLCG configurations 1012. For example, if the UE 1004 is configured with 50 SLCG configurations, the bitmap 1096 may comprise 50 bits to indicate the activation/release status of each of the 50 SLCG configurations. In some examples, the subset of SLCG configurations may include less than the total number of SLCG configurations. For example, the confirmation indicator 1024 may request that the UE 1004 provide the activation/release status of SLCG configurations 1 to 10. In such examples, the bitmap 1096 may comprise 10 bits to indicate the activation/release status of each of the 10 SLCG configurations.

It may be appreciated that the base station 1002 may switch the requested content of the UCI 1092 at times. For example, the base station 1002 may transmit the confirmation indicator 1024 set to a first value to cause the UE 1004 to include HARQ feedback (e.g., the second section 1092*b*), may set the confirmation indicator 1024 to a second value to cause the UE 1004 to include HARQ feedback and the activation/release status of SLCG configurations in the UCI 1092 (e.g., the first section 1092*a,* the second section 1092*b,* and the third section 1092*c*), and may set the confirmation indicator 1024 to a third value to cause the UE 1004 to include HARQ feedback and a bitmap indicating the activation/release status of a subset of SLCG configurations (e.g., the HARQ feedback section 1094 and the bitmap 1096).

In some examples, the base station 1002 may set the value of the confirmation indicator 1024 based on available resources. For example, when available resources are limited, the base station 1002 may set the confirmation indicator 1024 to the first value and when available resources are not limited, the base station 1002 may set the confirmation indicator 1024 to the second value or the third value.

Figure 13:
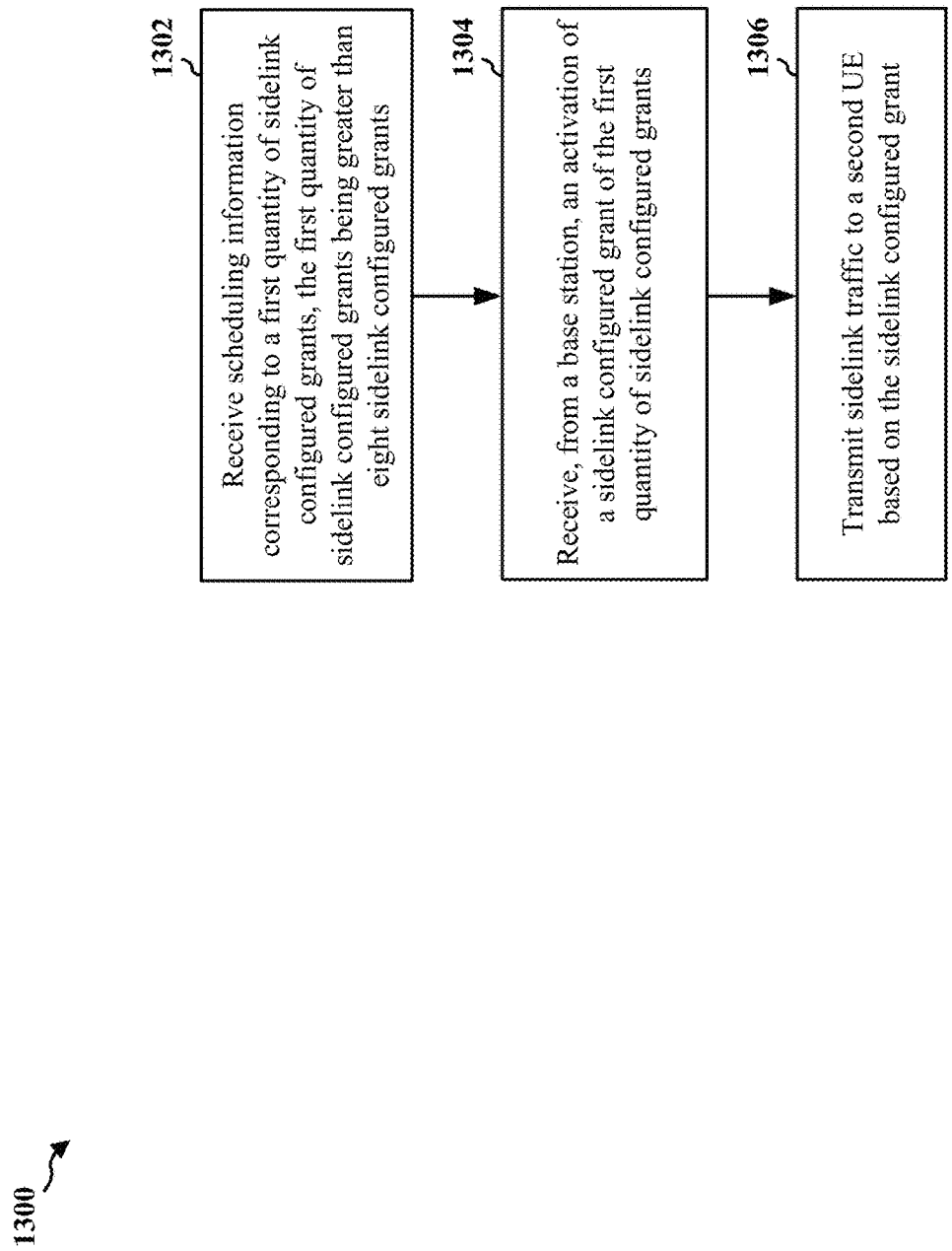
FIG. 13 is a flowchart of a method of wireless communication at a UE, in accordance with the teachings disclosed herein.

FIG. 13 is a flowchart 1300 of a method of wireless communication. The method may be performed by a UE (e.g., the UE 104, the UE 350, the apparatus 1502). The method may enable the UE to receive a configuration of larger numbers of configured grants from which one or more of the configured grants may be activated for the UE. The added number of configured grants enables more flexibility in scheduling at the UE, while maintaining reduced scheduling overhead through use of a configured grant.

At 1302, the UE receives scheduling information corresponding to a first quantity of sidelink configured grants, the first quantity of sidelink configured grants being greater than eight sidelink configured grants. The scheduling information may be based on any of the aspects described in connection with the configuration information 1010 in FIG. 10, for example. The reception of the scheduling information may be performed by the configured grant component 1540 of the apparatus 1502, via the reception component 1530 and/or the RF transceiver 1522, for example.

At 1304, the UE receives, from a base station, an activation of a sidelink configured grant of the first quantity of sidelink configured grants. In some aspects, the activation may be received in downlink control information (DCI) of a particular format. In some aspects, the activation may be received in DCI format 3_0. The activation may be based on any of the aspects described in connection with the first downlink transmission 1030 in FIG. 10, for example. In some aspects, the activation may be based on an increased number of bits for a configuration index, a combination of another field with a configuration index, and/or CRC scrambling for the configuration index. In some aspects, the activation may be a joint activation via a bitmap or an RRC table, a particular TRIV or FRIV, a CRC scrambling sequence, and/or or a dedicated field that indicates a joint activation. The reception of the activation may be performed by the CG activation/deactivation component 1542 of the apparatus 1502, via the reception component 1530 and/or the RF transceiver 1522, for example.

At 1306, the UE transmits sidelink traffic to a second UE based on the sidelink configured grant. For example, the UE transmits the sidelink traffic based on a currently activated configured grant. The sidelink transmission may be performed by the sidelink component 1544 of the apparatus 1502, via the reception component 1530 and/or the RF transceiver 1522, for example.

Figure 14:
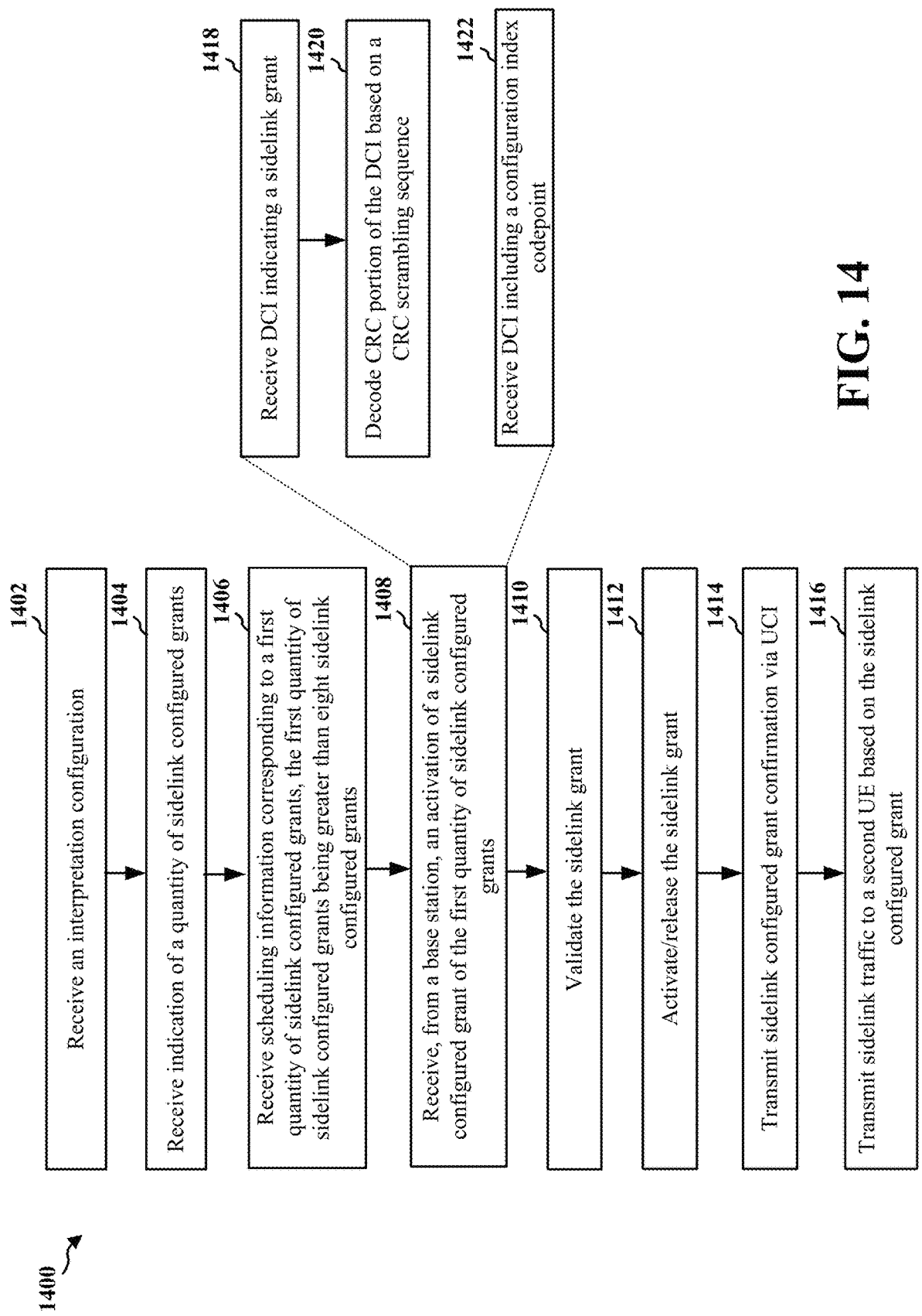
FIG. 14 is a flowchart of a method of wireless communication at a UE, in accordance with the teachings disclosed herein.

FIG. 14 is a flowchart 1400 of a method of wireless communication. The method may be performed by a UE (e.g., the UE 104, the UE 350, the apparatus 1502). The method may enable the UE to receive a configuration of larger numbers of configured grants from which one or more of the configured grants may be activated for the UE. The added number of configured grants enables more flexibility in scheduling at the UE, while maintaining reduced scheduling overhead through use of a configured grant.

At 1406, the UE receives scheduling information corresponding to a first quantity of sidelink configured grants, the first quantity of sidelink configured grants being greater than eight sidelink configured grants. For example, the UE may receive a configuration for more than 8 sidelink configured grants. For example, the scheduling information for the configured grants may be received in RRC signaling. The scheduling information may be received from a base station. The scheduling information may be based on any of the aspects described in connection with the configuration information 1010 in FIG. 10, for example. The reception of the scheduling information may be performed by the configured grant component 1540 of the apparatus 1502, via the reception component 1530 and/or the RF transceiver 1522, for example.

At 1408, the UE receives, from a base station, an activation of a sidelink configured grant of the first quantity of (e.g., more than 8) sidelink configured grants. In some aspects, the activation of the sidelink configured grant may be indicated via DCI including a configuration index codepoint. In some aspects, the activation may be received in DCI of a particular format. In some aspects, the activation may be received in DCI format 3_0. The activation may be based on any of the aspects described in connection with the first downlink transmission 1030 in FIG. 10, for example. The reception of the activation may be performed by the CG activation/deactivation component 1542 of the apparatus 1502, via the reception component 1530 and/or the RF transceiver 1522, for example.

In some aspects, at 1404, the UE may receive an indication of the first quantity of sidelink configured grants. The configuration index codepoint in the DCI may include a first quantity of bits to represent each of the first quantity of sidelink configured grants, the first quantity of bits based on the indication of the first quantity of sidelink configured grants. The reception of the quantity indication may be performed by the quantity indication component 1546 of the apparatus 1502, via the reception component 1530 and/or the RF transceiver 1522, for example.

In some aspects, the activation of the sidelink configured grant is indicated via the configuration index codepoint and a second codepoint of the DCI. The second codepoint may include a HARQ process number field. The second codepoint may include a resource pool index field. A first resource pool index may correspond to a first set of sidelink configured grants, and a second resource pool index may correspond to a second set of sidelink configured grants, and the first resource pool index and the second resource pool index map to a same physical resource pool. The second codepoint may include a resource allocation field for sidelink control information.

The activation of the sidelink configured grant may be indicated via the configuration index codepoint and a CRC scrambling sequence. A first CRC scrambling sequence may correspond to a first set of sidelink configured grants, and a second CRC scrambling sequence may correspond to a second set of sidelink configured grants.

In some aspects, the UE may receive downlink control information (DCI) indicating a sidelink grant, as illustrated at 1418. The reception of the DCI may be performed by the CG activation/deactivation component 1542 of the apparatus 1502, via the reception component 1530 and/or the RF transceiver 1522, for example. At 1422, the UE may decode a CRC portion of the DCI based on a CRC scrambling sequence. The decoding may be performed by the CRC component 1548 of the apparatus 1502 in FIG. 15. At 1410, the UE may validate the sidelink grant based on the CRC scrambling sequence and a configuration index codepoint of the DCI. The validation may be performed, e.g., by the validation component 1550 of the apparatus 1502 in FIG. 15.

In some aspects, the UE may receive an indication of the first quantity of sidelink configured grants, at 1404. The UE may validate the sidelink grant, at 1410, as a sidelink dynamic grant if the CRC scrambling sequence is associated with a sidelink dynamic grant, and the configuration index codepoint matches a configuration index greater than the first quantity of sidelink configured grants. The validation may be performed, e.g., by the validation component 1550 of the apparatus 1502 in FIG. 15.

In some aspects, the UE may receive DCI indicating a sidelink grant, at 1418. The reception of the DCI may be performed by the CG activation/deactivation component 1542 of the apparatus 1502, via the reception component 1530 and/or the RF transceiver 1522, for example. At 1420, the UE may decode a CRC portion of the DCI based on a CRC scrambling sequence. The decoding may be performed by the CRC component 1548 of the apparatus 1502 in FIG. 15. Then, at 1410, the UE may validate the sidelink grant based on the CRC scrambling sequence and a resource indication value of the DCI. The validation may be performed, e.g., by the validation component 1550 of the apparatus 1502 in FIG. 15.

At 1402, the UE may receive an interpretation configuration. The interpretation configuration may indicate that the configuration index codepoint corresponds to a bitmap, and the one or more sidelink configured grants may be indicated via a first value in the bitmap. The interpretation configuration may indicate that the configuration index codepoint corresponds to an index. The interpretation configuration may indicate that the configuration index codepoint maps to a configuration table. The UE may receive a configuration for the configuration table, map the configuration index codepoint to an entry in the configuration table, and identify the one or more sidelink configured grants based on the entry in the configuration table. The reception of the interpretation configuration may be performed by the interpretation configuration component 1552 of the apparatus 1502, via the reception component 1530 and/or the RF transceiver 1522, for example.

At 1408, the UE may receive DCI including a configuration index codepoint, e.g., as illustrated at 1422. The reception of the DCI may be performed by the CG activation/deactivation component 1542 of the apparatus 1502, via the reception component 1530 and/or the RF transceiver 1522, for example. The DCI may further include a resource indication value corresponding to the interpretation configuration. The DCI may further include a resource indication value indicating a joint activation of two or more sidelink configured grants. The DCI may include a field comprising the interpretation configuration. The UE may decode a CRC portion of the DCI based on a CRC scrambling sequence, and the CRC scrambling sequence may correspond to the interpretation configuration. The decoding may be performed by the CRC component 1548 of the apparatus 1502 in FIG. 15.

At 1412, the UE may activate or release one or more sidelink configured grants based on the interpretation configuration and the configuration index codepoint. The UE may transmit sidelink transmissions using resources of an activated configured grant. The UE may refrain from transmitting, or may not transmit, sidelink transmissions using resources of a released configured grant. The activation or release may be performed by the CG activation/deactivation component 1542 of the apparatus 1502, via the reception component 1530 and/or the RF transceiver 1522, for example.

At 1414, the UE may transmit, to the base station, a sidelink configured grant confirmation via uplink control information. The sidelink configured grant confirmation may include multiple bits to indicate, at least, feedback associated with the receiving of the activation of the sidelink configured grant, and feedback associated with the transmitting of the sidelink traffic based on the sidelink configured grant. The sidelink configured grant confirmation may include a single bit to indicate feedback associated with the transmitting of the sidelink traffic based on the sidelink configured grant. The sidelink configured grant configuration may include a bitmap corresponding to a first set of sidelink configured grants. Each bit of the bitmap may correspond to a respective sidelink configured grant of the first set of sidelink configured grants. For example, the UE may receive, from the base station, a configuration indicating sidelink configured grants of the first set of sidelink configured grants. The transmission of the sidelink configured grant confirmation may be performed by the confirmation component 1554 of the apparatus 1502 in FIG. 15.

At 1416, the UE transmits sidelink traffic to a second UE based on the sidelink configured grant. For example, the UE transmits the sidelink traffic based on a currently activated configured grant. The sidelink transmission may be performed by the sidelink component 1544 of the apparatus 1502, via the reception component 1530 and/or the RF transceiver 1522, for example.

Figure 15:
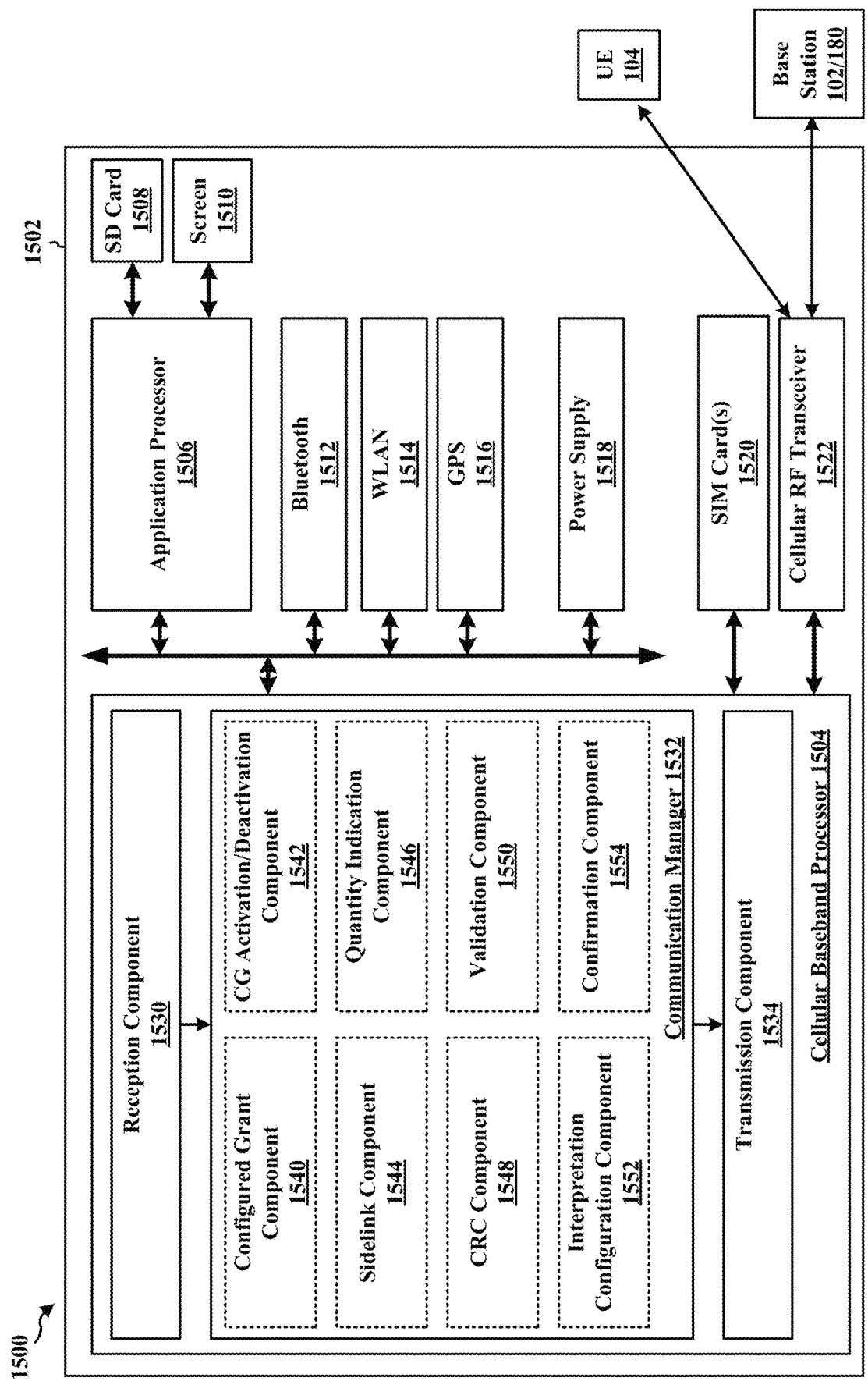
FIG. 15 is a diagram illustrating an example of a hardware implementation for an example apparatus, in accordance with the teachings disclosed herein.

FIG. 15 is a diagram 1500 illustrating an example of a hardware implementation for an apparatus 1502. The apparatus 1502 may be a UE, or another device configured to transmit and/or receive sidelink communication. The apparatus 1502 includes a baseband processor 1504 (also referred to as a modem) coupled to a RF transceiver 1522. In some aspects, the baseband processor 1504 may be a cellular baseband processor and/or the RF transceiver 1522 may be a cellular RF transceiver. The apparatus 1502 may further include one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and/or a power supply 1518. The baseband processor 1504 communicates through the RF transceiver 1522 with the UE 104 and/or BS 102/180. The baseband processor 1504 may include a computer-readable medium/memory. The computer-readable medium/memory may be non-transitory. The baseband processor 1504 is responsible for general processing, including the execution of software stored on the computer-readable medium/memory. The software, when executed by the baseband processor 1504, causes the baseband processor 1504 to perform the various functions described in the present application. The computer-readable medium/memory may also be used for storing data that is manipulated by the baseband processor 1504 when executing software. The baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband processor 1504. The baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see the UE 350 of FIG. 3) and include the additional modules of the apparatus 1502.

The communication manager 1532 includes a configured grant component 1540 that is configured to receive scheduling information corresponding to a first quantity of sidelink configured grants, the first quantity of sidelink configured grants being greater than eight sidelink configured grants, e.g., as described in connection with 1302 in FIG. 13 or 1406 in FIG. 14. The communication manager 1532 further includes a CG activation/deactivation component 1542 that is configured to receive, from a base station, an activation of a sidelink configured grant of the first quantity of sidelink configured grants, e.g., as described in connection with 1304 in FIG. 13 or 1408 in FIG. 14. The CG activation/deactivation component 1542 may be further configured to activate or release the sidelink grant, e.g., as described in connection with 1412 in FIG. 14. The communication manager 1532 further includes a sidelink component 1544 that is configured to transmit sidelink traffic to a second UE based on the sidelink configured grant, e.g., as described in connection with 1306 in FIG. 13 or 1416 in FIG. 14. The communication manager 1532 may further include a quantity indication component 1546 is configured to receive an indication of a quantity of sidelink configured grants, e.g., as described in connection with 1404 in FIG. 14. The communication manager 1532 may further include a CRC component 1548 that is configured to decode a CRC portion of the DCI based on a CRC scrambling sequence, e.g., as described in connection with 1420 in FIG. 14. The communication manager 1532 may further include a validation component 1550 that is configured to validate the sidelink grant, e.g., as described in connection with 1306 1410 in FIG. 14. The communication manager 1532 may further include an interpretation configuration component 1552 that is configured to receive an interpretation configuration, e.g., as described in connection with 1402 in FIG. 14. The communication manager 1532 may further include a confirmation component 1554 that is configured to transmit sidelink configured grant confirmation via UCI, e.g., as described in connection with 1414 in FIG. 14.

The apparatus may include additional components that perform each of the blocks of the algorithm in the flowcharts of FIG. 13 or 14. As such, each block in the flowcharts of FIG. 13 or 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the baseband processor 1504, includes means for receiving scheduling information corresponding to a first quantity of sidelink configured grants, the first quantity of sidelink configured grants being greater than eight sidelink configured grants. The apparatus includes means for receiving, from a base station, an activation of a sidelink configured grant of the first quantity of sidelink configured grants and means for transmitting sidelink traffic to a second UE based on the sidelink configured grant. The apparatus may further include means for receiving an indication of the first quantity of sidelink configured grants. The apparatus may further include means for receiving DCI indicating a sidelink grant, means for decoding a CRC portion of the DCI based on a CRC scrambling sequence, and means for validating the sidelink grant based on the CRC scrambling sequence and a configuration index codepoint of the DCI. The apparatus may further include means for receiving an indication of the first quantity of sidelink configured grants, where the UE validates the sidelink grant as a sidelink dynamic grant when the CRC scrambling sequence is associated with a sidelink dynamic grant, and the configuration index codepoint matches a configuration index greater than the first quantity of sidelink configured grants. The apparatus may further include means for receiving DCI indicating a sidelink grant, means for decoding a CRC portion of the DCI based on a CRC scrambling sequence, and means for validating the sidelink grant based on the CRC scrambling sequence and a resource indication value of the DCI. The apparatus may further include means for receiving an interpretation configuration, means for receiving DCI including a configuration index codepoint, and means for activating or releasing one or more sidelink configured grants based on the interpretation configuration and the configuration index codepoint. The apparatus may further include means for receiving a configuration for the configuration table, means for mapping the configuration index codepoint to an entry in the configuration table, and means for identifying the one or more sidelink configured grants based on the entry in the configuration table. The apparatus may further include means for decoding a CRC portion of the DCI based on a CRC scrambling sequence, and wherein the CRC scrambling sequence corresponds to the interpretation configuration. The apparatus may further include means for transmitting, to the base station, sidelink configured grant confirmation via uplink control information. The apparatus may further include means for receiving, from the base station, a configuration indicating sidelink configured grants of the first set of sidelink configured grants. The means may be one or more of the components of the apparatus 1502 configured to perform the functions recited by the means. As described herein, the apparatus 1502 may include the TX processor 368, the RX processor 356, and the controller/processor 359. As such, in one configuration, the means may be the TX processor 368, the RX processor 356, and the controller/processor 359 configured to perform the functions recited by the means.

Figure 16:
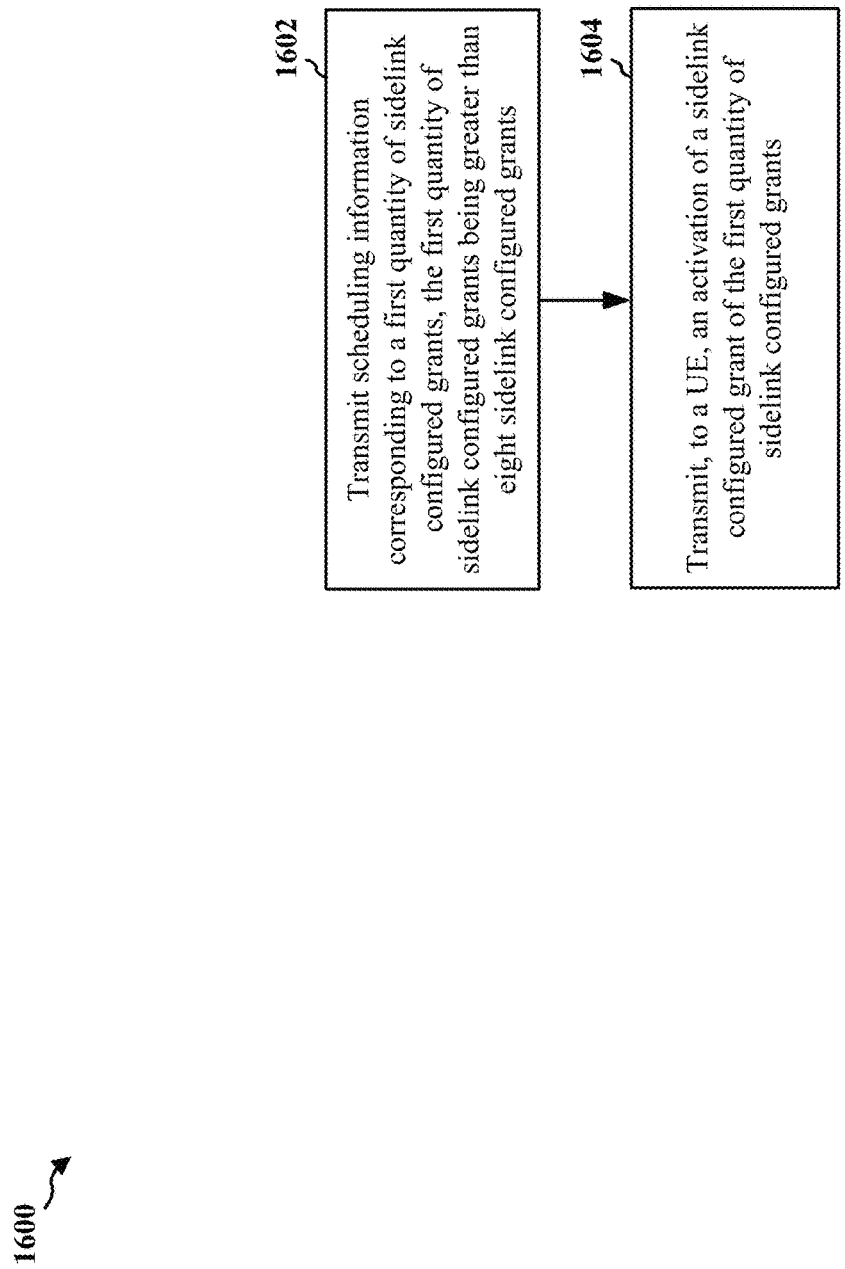
FIG. 16 is a flowchart of a method of wireless communication at a base station, in accordance with the teachings disclosed herein.

FIG. 16 is a flowchart 1600 of a method of wireless communication. The method may be performed by a base station (e.g., the base station 102 or 180, the base station 310, the apparatus 1802). The method may enable the base station to configure a UE with larger numbers of configured grants from which one or more of the configured grants may be activated for the UE. The added number of configured grants enables more flexibility in scheduling at the UE, while maintaining reduced scheduling overhead through use of a configured grant.

At 1602, the base station transmits scheduling information corresponding to a first quantity of sidelink configured grants, the first quantity of sidelink configured grants being greater than eight sidelink configured grants. The scheduling information may be based on any of the aspects described in connection with the configuration information 1010 in FIG. 10, for example. The transmission of the scheduling information may be performed by the configured grant component 1840 of the apparatus 1802, via the transmission component 1834 and/or the RF transceiver 1822, for example.

At 1604, the base station transmits, to a UE, an activation of a sidelink configured grant of the first quantity of sidelink configured grants. In some aspects, the activation may be transmitted in DCI of a particular format. In some aspects, the activation may be transmitted in DCI format 3_0. The activation may be based on any of the aspects described in connection with the first downlink transmission 1030 in FIG. 10, for example. In some aspects, the activation may be based on an increased number of bits for a configuration index, a combination of another field with a configuration index, and/or CRC scrambling for the configuration index. In some aspects, the activation may be a joint activation via a bitmap or an RRC table, a particular TRIV or FRIV, a CRC scrambling sequence, and/or or a dedicated field that indicates a joint activation. The transmission of the activation may be performed by the CG activation/deactivation component 1842 of the apparatus 1802, via the transmission component 1834 and/or the RF transceiver 1822, for example.

Figure 17:
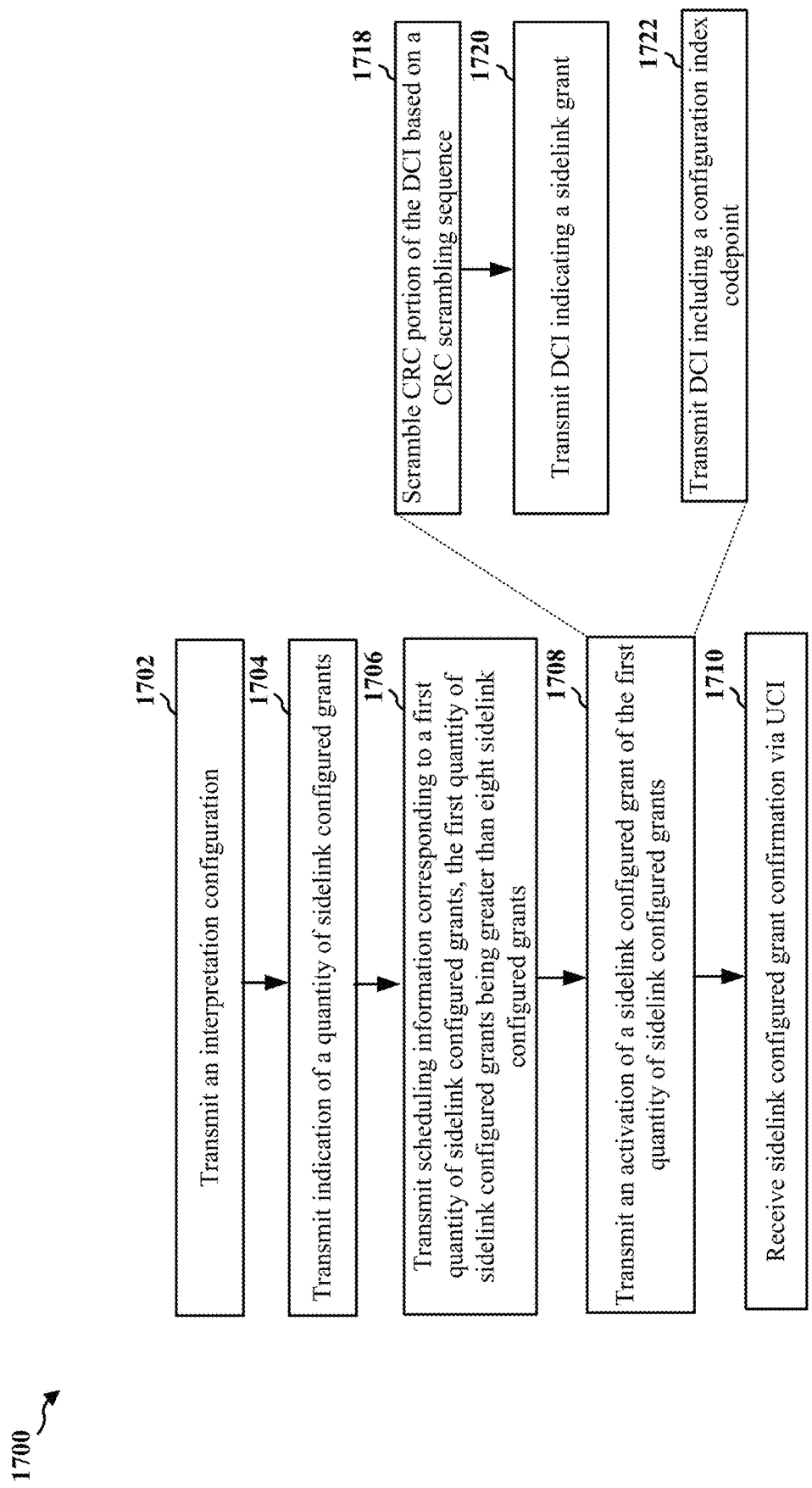
FIG. 17 is a flowchart of a method of wireless communication at a base station, in accordance with the teachings disclosed herein.

FIG. 17 is a flowchart 1700 of a method of wireless communication. The method may be performed by a base station (e.g., the base station 102 or 180, the base station 310, the apparatus 1802). The method may enable the base station to configure a UE with larger numbers of configured grants from which one or more of the configured grants may be activated for the UE. The added number of configured grants enables more flexibility in scheduling at the UE, while maintaining reduced scheduling overhead through use of a configured grant.

At 1706, the base station transmits scheduling information corresponding to a first quantity of sidelink configured grants, the first quantity of sidelink configured grants being greater than eight sidelink configured grants. For example, the base station may transmit a configuration for more than 8 sidelink configured grants. For example, the scheduling information for the configured grants may be transmitted in RRC signaling. The scheduling information may be based on any of the aspects described in connection with the configuration information 1010 in FIG. 10, for example. The transmission of the scheduling information may be performed by the configured grant component 1840 of the apparatus 1802, via the transmission component 1834 and/or the RF transceiver 1822, for example.

At 1708, the base station transmits an activation of a sidelink configured grant of the first quantity of (e.g., more than 8) sidelink configured grants. In some aspects, the activation of the sidelink configured grant may be indicated via DCI including a configuration index codepoint. In some aspects, the activation may be transmitted in DCI of a particular format. In some aspects, the activation may be transmitted in DCI format 3_0. The activation may be based on any of the aspects described in connection with the first downlink transmission 1030 in FIG. 10, for example. The transmission of the activation may be performed by the CG activation/deactivation component 1842 of the apparatus 1802, via the transmission component 1834 and/or the RF transceiver 1822, for example.

In some aspects, at 1704, the base station may transmit an indication of the first quantity of sidelink configured grants. The configuration index codepoint in the DCI may include a first quantity of bits to represent each of the first quantity of sidelink configured grants, the first quantity of bits based on the indication of the first quantity of sidelink configured grants. The transmission of the quantity indication may be performed by the quantity indication component 1846 of the apparatus 1802, via the transmission component 1834 and/or the RF transceiver 1822, for example.

In some aspects, the activation of the sidelink configured grant is indicated via the configuration index codepoint and a second codepoint of the DCI. The second codepoint may include a HARQ process number field. The second codepoint may include a resource pool index field. A first resource pool index may correspond to a first set of sidelink configured grants, and a second resource pool index may correspond to a second set of sidelink configured grants, and the first resource pool index and the second resource pool index map to a same physical resource pool. The second codepoint may include a resource allocation field for sidelink control information.

The activation of the sidelink configured grant may be indicated via the configuration index codepoint and a CRC scrambling sequence. A first CRC scrambling sequence may correspond to a first set of sidelink configured grants, and a second CRC scrambling sequence may correspond to a second set of sidelink configured grants.

In some aspects, the base station may transmit DCI indicating a sidelink grant, as illustrated at 1720. The transmission of the DCI may be performed by the CG activation/deactivation component 1842 of the apparatus 1802, via the transmission component 1834 and/or the RF transceiver 1822, for example. At 1718, the base station may scramble CRC portion of the DCI based on a CRC scrambling sequence. The scrambling may be performed by the CRC component 1848 of the apparatus 1802 in FIG. 18.

At 1702, the base station may transmit an interpretation configuration. The interpretation configuration may indicate that the configuration index codepoint corresponds to a bitmap, and the one or more sidelink configured grants may be indicated via a first value in the bitmap. The interpretation configuration may indicate that the configuration index codepoint corresponds to an index. The interpretation configuration may indicate that the configuration index codepoint maps to a configuration table. The base station may transmit a configuration for the configuration table, map the configuration index codepoint to an entry in the configuration table, and identify the one or more sidelink configured grants based on the entry in the configuration table. The transmission of the interpretation configuration may be performed by the interpretation configuration component 1852 of the apparatus 1802, via the transmission component 1834 and/or the RF transceiver 1822, for example.

At 1708, the base station may transmit DCI including a configuration index codepoint, e.g., as illustrated at 1722. The transmission of the DCI may be performed by the CG activation/deactivation component 1842 of the apparatus 1802, via the transmission component 1834 and/or the RF transceiver 1822, for example. The DCI may further include a resource indication value corresponding to the interpretation configuration. The DCI may further include a resource indication value indicating a joint activation of two or more sidelink configured grants. The DCI may include a field comprising the interpretation configuration. The base station may scramble a CRC portion of the DCI based on a CRC scrambling sequence, and the CRC scrambling sequence may correspond to the interpretation configuration. The scrambling may be performed by the CRC component 1848 of the apparatus 1802 in FIG. 18.

At 1710, the base station may receive, from a UE, a sidelink configured grant confirmation via uplink control information. The sidelink configured grant confirmation may include multiple bits to indicate, at least, feedback associated with the receiving of the activation of the sidelink configured grant, and feedback associated with the transmitting of the sidelink traffic based on the sidelink configured grant. The sidelink configured grant confirmation may include a single bit to indicate feedback associated with the transmitting of the sidelink traffic based on the sidelink configured grant. The sidelink configured grant configuration may include a bitmap corresponding to a first set of sidelink configured grants. Each bit of the bitmap may correspond to a respective sidelink configured grant of the first set of sidelink configured grants. For example, the base station may transmit a configuration indicating sidelink configured grants of the first set of sidelink configured grants. The reception of the sidelink configured grant confirmation may be performed by the confirmation component 1854 of the apparatus 1802 in FIG. 18.

Figure 18:
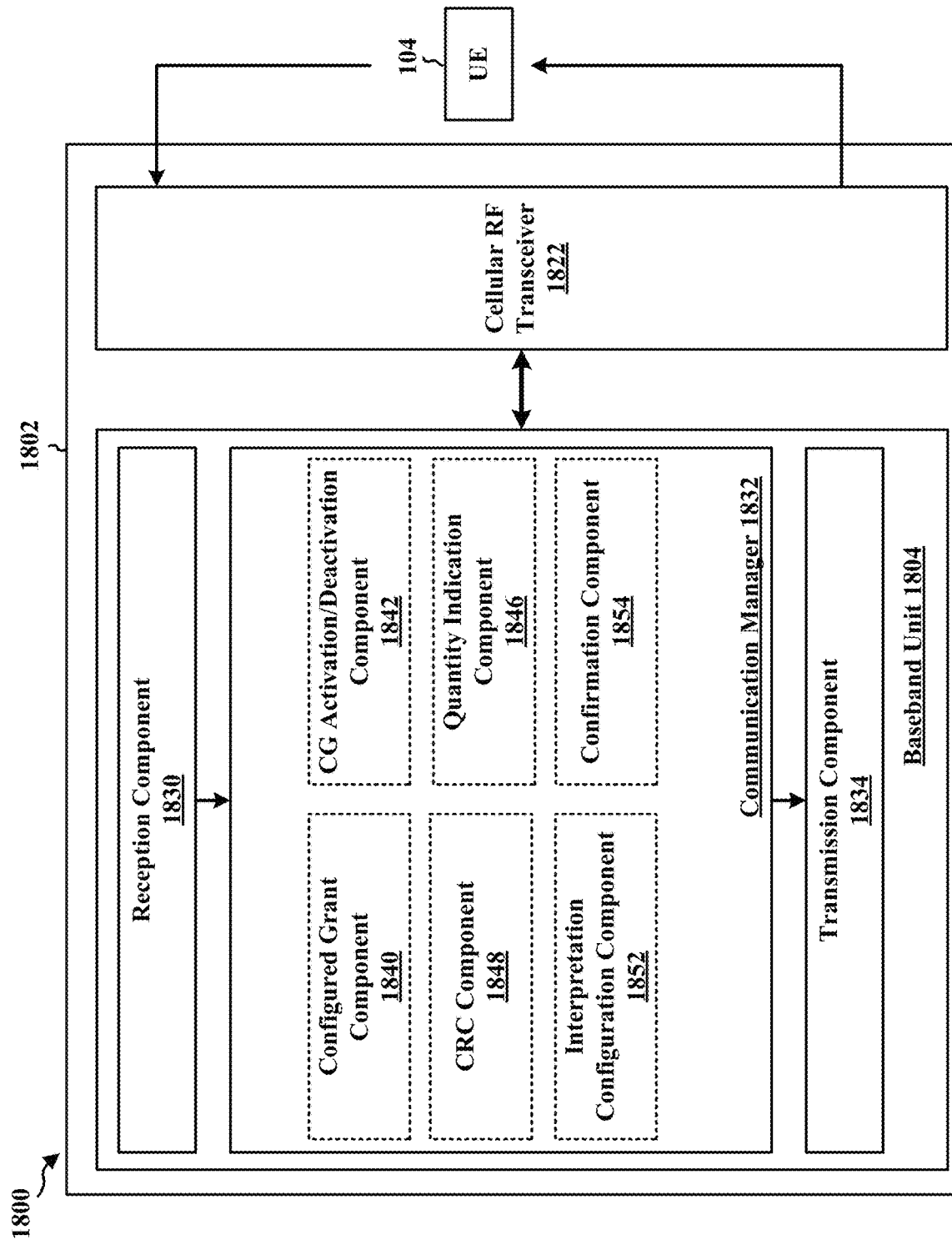
FIG. 18 is a diagram illustrating an example of a hardware implementation for an example apparatus, in accordance with the teachings disclosed herein.

FIG. 18 is a diagram 1800 illustrating an example of a hardware implementation for an apparatus 1802. The apparatus 1802 may be a base station, a component of a base station, or may implement base station functionality. In some aspects, the apparatus 1802 may include a baseband unit 1804. The baseband unit 1804 may communicate through a cellular RF transceiver 1822 with the UE 104. The baseband unit 1804 may include a computer-readable medium/memory. The baseband unit 1804 is responsible for general processing, including the execution of software stored on the computer-readable medium/memory. The software, when executed by the baseband unit 1804, causes the baseband unit 1804 to perform the various functions described supra. The computer-readable medium/memory may also be used for storing data that is manipulated by the baseband unit 1804 when executing software. The baseband unit 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the baseband unit 1804. The baseband unit 1804 may be a component of the base station 310 and may include the memory 376 and/or at least one of the TX processor 316, the RX processor 370, and the controller/processor 375.

The communication manager 1832 includes a configured grant component 1840 that is configured to transmit scheduling information corresponding to a first quantity of sidelink configured grants, the first quantity of sidelink configured grants being greater than eight sidelink configured grants, e.g., as described in connection with 1602 in FIG. 16 or 1706 in FIG. 17. The communication manager 1832 further includes a CG activation/deactivation component 1842 that is configured to transmit an activation of a sidelink configured grant of the first quantity of sidelink configured grants, e.g., as described in connection with 1604 in FIG. 16 or 1708 in FIG. 17. The communication manager 1832 may further include a quantity indication component 1846 is configured to transmit an indication of a quantity of sidelink configured grants, e.g., as described in connection with 1704 in FIG. 17. The communication manager 1832 may further include a CRC component 1848 that is configured to scramble a CRC portion of the DCI based on a CRC scrambling sequence, e.g., as described in connection with 1718 in FIG. 17. The communication manager 1832 may further include an interpretation configuration component 1852 that is configured to transmit an interpretation configuration, e.g., as described in connection with 1702 in FIG. 17. The communication manager 1832 may further include a confirmation component 1854 that is configured to receive sidelink configured grant confirmation via UCI, e.g., as described in connection with 1710 in FIG. 17.

The apparatus may include additional components that perform each of the blocks of the algorithm in the flowcharts of FIGS. 16 and 17. As such, each block in the flowcharts of FIGS. 16 and 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1802 may include a variety of components configured for various functions. In one configuration, the apparatus 1802, and in particular the baseband unit 1804, includes means for transmitting scheduling information corresponding to a first quantity of sidelink configured grants, the first quantity of sidelink configured grants being greater than eight sidelink configured grants. The apparatus includes means for transmitting an activation of a sidelink configured grant of the first quantity of sidelink configured grants and means for transmitting sidelink traffic to a second UE based on the sidelink configured grant. The apparatus may further include means for transmitting an indication of the first quantity of sidelink configured grants. The apparatus may further include means for transmitting DCI indicating a sidelink grant, and means for scrambling a CRC portion of the DCI based on a CRC scrambling sequence. The apparatus may further include means for transmitting an indication of the first quantity of sidelink configured grants. The apparatus may further include means for transmitting an interpretation configuration, means for transmitting DCI including a configuration index codepoint to activate or release one or more sidelink configured grants based on the interpretation configuration and the configuration index codepoint. The apparatus may further include means for transmitting a configuration for the configuration table. The apparatus may further include means for scrambling a CRC portion of the DCI based on a CRC scrambling sequence, and wherein the CRC scrambling sequence corresponds to the interpretation configuration. The apparatus may further include means for receiving, from a UE, sidelink configured grant confirmation via uplink control information. The apparatus may further include means for transmitting a configuration indicating sidelink configured grants of the first set of sidelink configured grants. The means may be one or more of the components of the apparatus 1802 configured to perform the functions recited by the means. As described supra, the apparatus 1802 may include the TX processor 316, the RX processor 370, and the controller/processor 375. As such, in one configuration, the means may be the TX processor 316, the RX processor 370, and the controller/processor 375 configured to perform the functions recited by the means.

Aspects disclosed herein provide techniques for indicating an activated or deactivated configuration that is included in an expanded set of SLCG configurations. The added number of configured grants enables more flexibility in scheduling at the UE, while maintaining reduced scheduling overhead through use of a configured grant. Aspects disclosed herein further provide techniques for joint SLCG activation and release. Aspects disclosed herein also provide techniques for validating the DCI to prevent the false interpretation of a dynamic grant as a configured grant, or of a configured grant as a dynamic grant. Aspects disclosed herein also provide techniques for transmitting the feedback via uplink control information (UCI).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a user equipment (UE) including at least one processor coupled to a memory and configured to receive scheduling information corresponding to a first quantity of sidelink configured grants, the first quantity of sidelink configured grants being greater than eight sidelink configured grants; receive, from a base station, an activation of a sidelink configured grant of the first quantity of sidelink configured grants; and transmit sidelink traffic to a second UE based on the sidelink configured grant.

Aspect 2 is the apparatus of aspect 1, further including that the activation of the sidelink configured grant is indicated via downlink control information (DCI) including a configuration index codepoint.

Aspect 3 is the apparatus of any of aspects 1 and 2, further including that the at least one processor is further configured to: receive an indication of the first quantity of sidelink configured grants, wherein the configuration index codepoint comprises a first quantity of bits to represent each of the first quantity of sidelink configured grants, the first quantity of bits based on the indication of the first quantity of sidelink configured grants.

Aspect 4 is the apparatus of any of aspects 1 to 3, further including that the activation of the sidelink configured grant is indicated via the configuration index codepoint and a second codepoint of the DCI.

Aspect 5 is the apparatus of any of aspects 1 to 4, further including that the second codepoint comprises a hybrid automatic repeat request (HARD) process number field.

Aspect 6 is the apparatus of any of aspects 1 to 5, further including that the second codepoint comprises a resource pool index field.

Aspect 7 is the apparatus of any of aspects 1 to 6, further including that a first resource pool index corresponds to a first set of sidelink configured grants, a second resource pool index corresponds to a second set of sidelink configured grants, and the first resource pool index and the second resource pool index map to a same physical resource pool.

Aspect 8 is the apparatus of any of aspects 1 to 7, further including that the second codepoint comprises a resource allocation field for sidelink control information.

Aspect 9 is the apparatus of any of aspects 1 to 8, further including that the activation of the sidelink configured grant is indicated via the configuration index codepoint and a cyclic redundancy check (CRC) scrambling sequence.

Aspect 10 is the apparatus of any of aspects 1 to 9, further including that a first CRC scrambling sequence corresponds to a first set of sidelink configured grants, and a second CRC scrambling sequence corresponds to a second set of sidelink configured grants.

Aspect 11 is the apparatus of any of aspects 1 to 10, further including that the at least one processor is further configured to: receive downlink control information (DCI) indicating a sidelink grant; decode a cyclic redundancy check (CRC) portion of the DCI based on a CRC scrambling sequence; and validate the sidelink grant based on the CRC scrambling sequence and a configuration index codepoint of the DCI.

Aspect 12 is the apparatus of any of aspects 1 to 11, further including that the at least one processor is further configured to: receive an indication of the first quantity of sidelink configured grants, wherein the UE validates the sidelink grant as a sidelink dynamic grant when the CRC scrambling sequence is associated with a sidelink dynamic grant, and the configuration index codepoint matches a configuration index greater than the first quantity of sidelink configured grants.

Aspect 13 is the apparatus of any of aspects 1 to 12, further including that the at least one processor is further configured to: receive downlink control information (DCI) indicating a sidelink grant; decode a cyclic redundancy check (CRC) portion of the DCI based on a CRC scrambling sequence; and validate the sidelink grant based on the CRC scrambling sequence and a resource indication value of the DCI.

Aspect 14 is the apparatus of any of aspects 1 to 13, further including that the at least one processor is further configured to: receive an interpretation configuration; receive downlink control information (DCI) including a configuration index codepoint; and activate or releasing one or more sidelink configured grants based on the interpretation configuration and the configuration index codepoint.

Aspect 15 is the apparatus of any of aspects 1 to 14, further including that the interpretation configuration indicates that the configuration index codepoint corresponds to a bitmap, and the one or more sidelink configured grants are indicated via a first value in the bitmap.

Aspect 16 is the apparatus of any of aspects 1 to 15, further including that the interpretation configuration indicates that the configuration index codepoint corresponds to an index.

Aspect 17 is the apparatus of any of aspects 1 to 16, further including that the interpretation configuration indicates that the configuration index codepoint maps to a configuration table.

Aspect 18 is the apparatus of any of aspects 1 to 17, further including that the at least one processor is further configured to: receive a configuration for the configuration table; map the configuration index codepoint to an entry in the configuration table; and identify the one or more sidelink configured grants based on the entry in the configuration table.

Aspect 19 is the apparatus of any of aspects 1 to 18, further including that the DCI further includes a resource indication value corresponding to the interpretation configuration.

Aspect 20 is the apparatus of any of aspects 1 to 19, further including that the DCI further includes a resource indication value indicating a joint activation of two or more sidelink configured grants.

Aspect 21 is the apparatus of any of aspects 1 to 20, further including that the at least one processor is further configured to: decode a cyclic redundancy check (CRC) portion of the DCI based on a CRC scrambling sequence, and wherein the CRC scrambling sequence corresponds to the interpretation configuration.

Aspect 22 is the apparatus of any of aspects 1 to 21, further including that the DCI includes a field comprising the interpretation configuration.

Aspect 23 is the apparatus of any of aspects 1 to 22, further including that the at least one processor is further configured to: transmit, to the base station, a sidelink configured grant confirmation via uplink control information.

Aspect 24 is the apparatus of any of aspects 1 to 23, further including that the sidelink configured grant confirmation includes multiple bits to indicate, at least, feedback associated with the receiving of the activation of the sidelink configured grant, and feedback associated with the transmitting of the sidelink traffic based on the sidelink configured grant.

Aspect 25 is the apparatus of any of aspects 1 to 24, further including that the sidelink configured grant confirmation includes a single bit to indicate feedback associated with the transmitting of the sidelink traffic based on the sidelink configured grant.

Aspect 26 is the apparatus of any of aspects 1 to 25, further including that the sidelink configured grant configuration includes a bitmap corresponding to a first set of sidelink configured grants, and wherein each bit of the bitmap corresponds to a respective sidelink configured grant of the first set of sidelink configured grants.

Aspect 27 is the apparatus of any of aspects 1 to 26, further including that the at least one processor is further configured to: receive, from the base station, a configuration indicating sidelink configured grants of the first set of sidelink configured grants.

Aspect 28 is a method of wireless communication for implementing any of aspects 1 to 27.

Aspect 29 is an apparatus for wireless communication including means for implementing any of aspects 1 to 27.

Aspect 30 is a non-transitory computer-readable storage medium storing computer executable code, where the code, when executed, causes a processor to implement any of aspects 1 to 27.

Aspect 31 is an apparatus for wireless communication at a base station including at least one processor coupled to a memory and configured to transmit scheduling information corresponding to a first quantity of sidelink configured grants, the first quantity of sidelink configured grants being greater than eight sidelink configured grants; and transmit, to a user equipment (UE), an activation of a sidelink configured grant of the first quantity of sidelink configured grants.

Aspect 32 is the apparatus of aspect 31, further including that the activation of the sidelink configured grant is indicated via downlink control information (DCI) including a configuration index codepoint.

Aspect 33 is the apparatus of any of aspects 31 and 32, further including that the at least one processor is further configured to: transmit an indication of the first quantity of sidelink configured grants, wherein the configuration index codepoint comprises a first quantity of bits to represent each of the first quantity of sidelink configured grants, the first quantity of bits based on the indication of the first quantity of sidelink configured grants.

Aspect 34 is the apparatus of any of aspects 31 to 33, further including that the activation of the sidelink configured grant is indicated via the configuration index codepoint and a second codepoint of the DCI.

Aspect 35 is the apparatus of any of aspects 31 to 34, further including that the second codepoint comprises a hybrid automatic repeat request (HARD) process number field.

Aspect 36 is the apparatus of any of aspects 31 to 35, further including that the second codepoint comprises a resource pool index field.

Aspect 37 is the apparatus of any of aspects 31 to 36, further including that a first resource pool index corresponds to a first set of sidelink configured grants, a second resource pool index corresponds to a second set of sidelink configured grants, and the first resource pool index and the second resource pool index map to a same physical resource pool.

Aspect 38 is the apparatus of any of aspects 31 to 37, further including that the second codepoint comprises a resource allocation field for sidelink control information.

Aspect 39 is the apparatus of any of aspects 31 to 38, further including that the activation of the sidelink configured grant is indicated via the configuration index codepoint and a cyclic redundancy check (CRC) scrambling sequence.

Aspect 40 is the apparatus of any of aspects 31 to 39, further including that a first CRC scrambling sequence corresponds to a first set of sidelink configured grants, and a second CRC scrambling sequence corresponds to a second set of sidelink configured grants.

Aspect 41 is the apparatus of any of aspects 31 to 40, further including that the at least one processor is further configured to: scramble a cyclic redundancy check (CRC) portion of downlink control information (DCI) based on a CRC scrambling sequence; and transmit the DCI indicating a sidelink grant.

Aspect 42 is the apparatus of any of aspects 31 to 41, further including that the at least one processor is further configured to: transmit an indication of the first quantity of sidelink configured grants.

Aspect 43 is the apparatus of any of aspects 31 to 42, further including that the at least one processor is further configured to: transmit an interpretation configuration; and transmit downlink control information (DCI) including a configuration index codepoint.

Aspect 44 is the apparatus of any of aspects 31 to 43, further including that the interpretation configuration indicates that the configuration index codepoint corresponds to a bitmap, and the one or more sidelink configured grants are indicated via a first value in the bitmap.

Aspect 45 is the apparatus of any of aspects 31 to 44, further including that the interpretation configuration indicates that the configuration index codepoint corresponds to an index.

Aspect 46 is the apparatus of any of aspects 31 to 45, further including that the interpretation configuration indicates that the configuration index codepoint maps to a configuration table.

Aspect 47 is the apparatus of any of aspects 31 to 46, further including that the at least one processor is further configured to: transmit a configuration for the configuration table.

49

Aspect 48 is the apparatus of any of aspects 31 to 47, further including that the DCI further includes a resource indication value corresponding to the interpretation configuration.

Aspect 49 is the apparatus of any of aspects 31 to 48, further including that the DCI further includes a resource indication value indicating a joint activation of two or more sidelink configured grants.

Aspect 50 is the apparatus of any of aspects 31 to 49, further including that the at least one processor is further configured to: scramble a cyclic redundancy check (CRC) portion of the DCI based on a CRC scrambling sequence, and wherein the CRC scrambling sequence corresponds to the interpretation configuration.

Aspect 51 is the apparatus of any of aspects 31 to 50, further including that the DCI includes a field comprising the interpretation configuration.

Aspect 52 is the apparatus of any of aspects 31 to 51, further including that the at least one processor is further configured to: receive, from the UE, a sidelink configured grant confirmation via uplink control information.

Aspect 53 is the apparatus of any of aspects 31 to 52, further including that the sidelink configured grant confirmation includes multiple bits to indicate, at least, feedback associated with the receiving of the activation of the sidelink configured grant, and feedback associated with transmitting sidelink traffic based on the sidelink configured grant.

Aspect 54 is the apparatus of any of aspects 31 to 53, further including that the sidelink configured grant confirmation includes a single bit to indicate feedback associated with transmitting of sidelink traffic based on the sidelink configured grant.

Aspect 55 is the apparatus of any of aspects 31 to 54, further including that the sidelink configured grant configuration includes a bitmap corresponding to a first set of sidelink configured grants, and wherein each bit of the bitmap corresponds to a respective sidelink configured grant of the first set of sidelink configured grants.

Aspect 56 is the apparatus of any of aspects 31 to 55, further including that the at least one processor is further configured to: transmit, to the UE, a configuration indicating sidelink configured grants of the first set of sidelink configured grants.

Aspect 57 is a method of wireless communication for implementing any of aspects 31 to 56.

Aspect 58 is an apparatus for wireless communication including means for implementing any of aspects 31 to 56.

Aspect 59 is a non-transitory computer-readable storage medium storing computer executable code, where the code, when executed, causes a processor to implement any of aspects 31 to 56.

What is claimed is:

1. An apparatus for wireless communication at a user equipment (UE), comprising:
    one or more memories; and
    one or more processors coupled to the one or more memories and configured to cause the UE to:
        receive, in radio resource control (RRC) signaling, scheduling information corresponding to a first quantity of sidelink configured grants, the first quantity of sidelink configured grants being greater than eight sidelink configured grants;
        receive, in downlink control information (DCI), an activation of a sidelink configured grant of the first quantity of sidelink configured grants, wherein the activation is indicated based on at least one of:

50 a configuration index having a number of bits indicated by an RRC signaled parameter that indicates a quantity of bits of the configuration index in the DCI for the activation of sidelink configured grants, wherein the configuration index indicates the activation of the sidelink configured grant from the first quantity of sidelink configured grants,
            a first combination of a configuration index codepoint of the DCI and a second codepoint of the DCI, wherein the first combination indicates the activation of the sidelink configured grant from the first quantity of sidelink configured grants, or
            a second combination of the configuration index codepoint of the DCI and a cyclic redundancy check (CRC) scrambling sequence for the DCI, wherein the second combination indicates the activation of the sidelink configured grant from the first quantity of sidelink configured grants; and
        transmit sidelink traffic to a second UE based on the sidelink configured grant.

2. The apparatus of claim 1, wherein the activation of the sidelink configured grant is indicated in the DCI including the configuration index codepoint.

3. The apparatus of claim 2, wherein the one or more processors are further configured to cause the UE to:
    receive, in the RRC signaling, an indication of the first quantity of sidelink configured grants, the RRC signaled parameter indicating the quantity of bits of the configuration index in the DCI,
    wherein the configuration index codepoint comprises a second quantity of bits to represent each of the first quantity of sidelink configured grants, the second quantity of bits based on the indication of the first quantity of sidelink configured grants.

4. The apparatus of claim 2, wherein the activation of the sidelink configured grant is indicated via the first combination of the configuration index codepoint and the second codepoint of the DCI.

5. The apparatus of claim 4, wherein the second codepoint comprises a hybrid automatic repeat request (HARQ) process number field.

6. The apparatus of claim 4, wherein the second codepoint comprises a resource pool index field.

7. The apparatus of claim 6, wherein a first resource pool index corresponds to a first set of sidelink configured grants, a second resource pool index corresponds to a second set of sidelink configured grants, and the first resource pool index and the second resource pool index each map to a same physical resource pool.

8. The apparatus of claim 4, wherein the second codepoint comprises a resource allocation field for sidelink control information.

9. The apparatus of claim 2, wherein the activation of the sidelink configured grant is indicated via the second combination of the configuration index codepoint and the CRC scrambling sequence.

10. The apparatus of claim 9, wherein a first CRC scrambling sequence corresponds to a first set of sidelink configured grants, and a second CRC scrambling sequence corresponds to a second set of sidelink configured grants.

11. The apparatus of claim 1, wherein the one or more processors are further configured to cause the UE to:
    decode a CRC portion of the DCI based on a CRC scrambling sequence; and validate the sidelink configured grant based on the CRC scrambling sequence and the configuration index codepoint of the DCI.

12. The apparatus of claim 11, wherein the one or more processors are further configured to cause the UE to:
receive an indication of the first quantity of sidelink configured grants,
wherein the UE validates the sidelink configured grant as a sidelink dynamic grant when:
the CRC scrambling sequence is associated with the sidelink dynamic grant, and
the configuration index codepoint matches the configuration index greater than the first quantity of sidelink configured grants.

13. The apparatus of claim 1, wherein the one or more processors are further configured to cause the UE to:
decode a CRC portion of the DCI based on a CRC scrambling sequence; and
validate the sidelink configured grant based on the CRC scrambling sequence and a resource indication value of the DCI.

14. The apparatus of claim 1, wherein the one or more processors are further configured to cause the UE to:
receive an interpretation configuration; and
activate or release one or more sidelink configured grants based on the interpretation configuration and the configuration index codepoint of the DCI.

15. The apparatus of claim 14, wherein the interpretation configuration indicates that the configuration index codepoint corresponds to a bitmap, and the one or more sidelink configured grants are indicated via a first value in the bitmap.

16. The apparatus of claim 14, wherein the interpretation configuration indicates that the configuration index codepoint corresponds to an index.

17. The apparatus of claim 14, wherein the interpretation configuration indicates that the configuration index codepoint is mapped to a configuration table.

18. The apparatus of claim 17, wherein the one or more processors are further configured to cause the UE to:
receive a configuration for the configuration table;
map the configuration index codepoint to an entry in the configuration table; and
identify the one or more sidelink configured grants based on the entry in the configuration table.

19. The apparatus of claim 14, wherein the DCI further includes a resource indication value corresponding to the interpretation configuration.

20. The apparatus of claim 14, wherein the DCI further includes a resource indication value indicating a joint activation of two or more sidelink configured grants.

21. The apparatus of claim 14, wherein the one or more processors are further configured to cause the UE to:
decode a CRC portion of the DCI based on a CRC scrambling sequence, and wherein the CRC scrambling sequence corresponds to the interpretation configuration.

22. The apparatus of claim 14, wherein the DCI includes a field comprising the interpretation configuration.

23. The apparatus of claim 1, wherein the one or more processors are further configured to cause the UE to:
transmit a sidelink configured grant confirmation via uplink control information.

24. The apparatus of claim 23, wherein the sidelink configured grant confirmation includes multiple bits to indicate, at least, first feedback associated with receiving of the activation of the sidelink configured grant, and second feedback associated with transmitting the sidelink traffic based on the sidelink configured grant.

25. The apparatus of claim 23, wherein the sidelink configured grant confirmation includes a single bit to indicate feedback associated with transmitting the sidelink traffic based on the sidelink configured grant.

26. The apparatus of claim 23, wherein the sidelink configured grant confirmation includes a bitmap corresponding to a first set of sidelink configured grants, and wherein each bit of the bitmap corresponds to a respective sidelink configured grant of the first set of sidelink configured grants.

27. The apparatus of claim 26, wherein the one or more processors are further configured to cause the UE to:
receive a configuration indicating one or more sidelink configured grants of the first set of sidelink configured grants.

28. The apparatus of claim 1, further comprising a transceiver coupled to the one or more processors.

29. A method wireless communication at a user equipment (UE), comprising:
receiving, in radio resource control (RRC) signaling, scheduling information corresponding to a first quantity of sidelink configured grants, the first quantity of sidelink configured grants being greater than eight sidelink configured grants;
receiving, in downlink control information (DCI), an activation of a sidelink configured grant of the first quantity of sidelink configured grants, wherein the activation is indicated based on at least one of:
a configuration index having a number of bits indicated by an RRC signaled parameter that indicates a quantity of bits of the configuration index in the DCI for the activation of sidelink configured grants, wherein the configuration index indicates the activation of the sidelink configured grant from the first quantity of sidelink configured grants,
a first combination of a configuration index codepoint of the DCI and a second codepoint of the DCI, wherein the first combination indicates the activation of the sidelink configured grant from the first quantity of sidelink configured grants, or
a second combination of the configuration index codepoint of the DCI and a cyclic redundancy check (CRC) scrambling sequence for the DCI, wherein the second combination indicates the activation of the sidelink configured grant from the first quantity of sidelink configured grants; and
transmitting sidelink traffic to a second UE based on the sidelink configured grant.

30. An apparatus for wireless communication at a base station, comprising:
one or more memories; and
one or more processors coupled to the one or more memories and configured to cause the base station to:
transmit, in radio resource control (RRC) signaling, scheduling information corresponding to a first quantity of sidelink configured grants, the first quantity of sidelink configured grants being greater than eight sidelink configured grants; and
transmit, in downlink control signaling (DCI) for a user equipment (UE), an activation of a sidelink configured grant of the first quantity of sidelink configured grants, wherein the activation is indicated based on at least one of:
a configuration index having a number of bits indicated by an RRC signaled parameter that indicates a quantity of bits of the configuration index in the DCI for the activation of sidelink configured grants, wherein the configuration index indicates the activation of the sidelink configured grant from the first quantity of sidelink configured grants,
- a first combination of a configuration index codepoint of the DCI and a second codepoint of the DCI, wherein the first combination indicates the activation of the sidelink configured grant from the first quantity of sidelink configured grants, or
- a second combination of the configuration index codepoint of the DCI and a cyclic redundancy check (CRC) scrambling sequence for the DCI, wherein the second combination indicates the activation of the sidelink configured grant from the first quantity of sidelink configured grants.

31. The apparatus of claim 1, wherein the first quantity of sidelink configured grants is between 16 to 128 sidelink configured grants.

32. The apparatus of claim 30, wherein the first quantity of sidelink configured grants is between 16 to 128 sidelink configured grants.

* * * * *